US012705078B2

(12) United States Patent
Bhamidipati et al.

(10) Patent No.: US 12,705,078 B2
(45) Date of Patent: Aug. 11, 2026

(54) FORM FIELD RECOMMENDATION MANAGEMENT

(71) Applicant: Oracle International Corporation, Redwood Shores, CA (US)

(72) Inventors: Subash Bhamidipati, Issaquah, WA (US); Kuldip Oberoi, Milpitas, CA (US); Karan Nayyar, Foster City, CA (US); John Ray Thomas, Aptos, CA (US); Blake Thomas Sullivan, San Francisco, CA (US); Raj Karpana Alagumalai, Redmond, WA (US); Van Hieu Tran, Pflugerville, TX (US); Kevin Ng, Hampshire (GB)

(73) Assignee: Oracle International Corporation, Redwood Shores, CA (US)

(*) Notice: Subject to any disclaimer, the term of this patent is extended or adjusted under 35 U.S.C. 154(b) by 165 days.

(21) Appl. No.: 18/481,910

(22) Filed: Oct. 5, 2023

(65) Prior Publication Data

US 2024/0338233 A1 Oct. 10, 2024

Related U.S. Application Data

(60) Provisional application No. 63/494,563, filed on Apr. 6, 2023.

(51) Int. Cl.
*G06F 9/451* (2018.01)
*G06F 16/215* (2019.01)
*G06F 40/174* (2020.01)

(52) U.S. Cl.
CPC ............ *G06F 9/453* (2018.02); *G06F 16/215* (2019.01); *G06F 40/174* (2020.01)

(58) Field of Classification Search
CPC ....... G06F 9/453; G06F 16/215; G06F 40/174
See application file for complete search history.

(56) References Cited

U.S. PATENT DOCUMENTS 4,955,066 A * 9/1990 Notenboom ............ H03M 7/42 382/229
6,020,886 A * 2/2000 Jacober ................... G06F 9/453 715/709

(Continued)

FOREIGN PATENT DOCUMENTS

WO WO-2016064314 A1 * 4/2016 ............ G06F 3/013

OTHER PUBLICATIONS

"Auto Populate Forms", Retrieved from https://www.wufoo.com/guides/auto-populate-forms/, Jun. 29, 2023, p. 1.

(Continued)

*Primary Examiner* — Justin R. Blaufeld
(74) *Attorney, Agent, or Firm* — Invoke

(57) ABSTRACT

Techniques for generating recommendations for form fields are disclosed. A system obtains user interaction data based on a user's interaction with a digital form. The digital form includes form fields mapped to attribute fields of data object resources. The data object resources specify criteria for when recommendations should be permitted or prohibited for the attribute fields of the business objects. The system obtains the criteria from the data object resources corresponding to the form fields in the digital form. The system compares the user interaction data with the recommendation enablement criteria to determine whether to allow the generation and presentation of recommendations for respective form fields. If the recommendation enablement criteria are met, the system applies a recommendation-type machine learning model to a set of input data including the user interaction data to generate a set of recommendations for a form field.

22 Claims, 14 Drawing Sheets

(56) References Cited

U.S. PATENT DOCUMENTS 6,021,403 A * 2/2000 Horvitz .................... G06N 5/00 706/45
6,651,053 B1 * 11/2003 Rothschild .......... G06F 16/9554 707/960
6,657,643 B1 * 12/2003 Horvitz ................ G06Q 10/109 715/764
6,690,390 B1 * 2/2004 Walters .................. G06Q 30/02 715/764
6,785,649 B1 * 8/2004 Hoory ..................... G10L 13/08 704/235
6,806,906 B1 * 10/2004 Soga .................... H04N 23/675 348/333.03
7,343,551 B1 * 3/2008 Bourdev ................. G06F 40/30 715/224
7,506,265 B1 * 3/2009 Traut .................. G06F 9/45537 715/838
7,644,351 B1 * 1/2010 Portnoy ................ G06F 40/174 715/224
7,669,125 B2 * 2/2010 Smirnov ............... G06F 3/0481 715/708
8,219,115 B1 * 7/2012 Nelissen ................... G06F 9/54 455/418
8,346,791 B1 * 1/2013 Shukla ................ G06F 16/3338 707/759
8,386,931 B2 * 2/2013 Guckenheimer ... G06F 3/04895 715/708
8,555,199 B2 * 10/2013 Kurtz .................. G06F 3/04847 715/792
8,566,718 B1 * 10/2013 O'Neill .................. G09B 5/067 703/22
8,645,825 B1 * 2/2014 Cornea ................. G06F 40/232 715/257
8,839,090 B2 * 9/2014 Boss ................... G06F 16/9535 715/224
8,839,093 B1 * 9/2014 Siroker ................... H04L 67/10 715/234
9,031,970 B1 * 5/2015 Das ....................... G06F 40/274 707/706
9,116,872 B1 * 8/2015 Channakeshava .. G06F 16/9535
9,785,534 B1 * 10/2017 Paulus ................ G06F 11/3041
10,089,292 B2 10/2018 Shetty et al.
10,223,344 B2 3/2019 Dakin et al.
10,293,260 B1 * 5/2019 Evans ................... A63F 13/424
10,417,613 B1 * 9/2019 Brisebois .............. G06F 21/552
11,283,888 B2 * 3/2022 Joseph ................. G06Q 10/107
11,347,780 B2 5/2022 Pei
11,853,937 B1 * 12/2023 Porrata .................... G06N 3/08
2003/0103656 A1 * 6/2003 Lapstun ............. G06Q 20/3674 382/113
2004/0145601 A1 * 7/2004 Brielmann .............. G06F 9/453 715/708
2004/0230599 A1 * 11/2004 Moore .................. G06F 3/0481 707/999.102
2005/0102607 A1 * 5/2005 Rousselle ............. G06F 40/166 715/209
2005/0138559 A1 * 6/2005 Santos-Gomez ....... G06F 9/453 715/713
2005/0153688 A1 * 7/2005 Burkhart ................. H04L 67/08 455/414.3
2005/0234959 A1 * 10/2005 Ronnewinkel ......... G06Q 10/10 707/999.102
2005/0257134 A1 11/2005 Goodman et al.
2005/0268234 A1 * 12/2005 Rossi ...................... G06F 9/453 715/705
2006/0074844 A1 * 4/2006 Frankel .................. G06Q 10/06
2006/0074866 A1 * 4/2006 Chamberlain .......... G06F 40/18
2006/0173816 A1 * 8/2006 Jung ...................... G06Q 10/00
2006/0218088 A1 * 9/2006 Flora ...................... G06Q 10/10 705/39
2006/0224558 A1 * 10/2006 Flora ...................... G06Q 30/04
2006/0235736 A1 * 10/2006 Guckenheimer ...... G06Q 10/06 715/708
2006/0242607 A1 * 10/2006 Hudson ............... G06F 3/04817 715/863
2007/0061722 A1 * 3/2007 Kronlund .............. G06F 3/0481 715/705
2007/0226650 A1 * 9/2007 Hintermeister ......... G06F 3/048 715/822
2008/0027958 A1 * 1/2008 Kapoor ................. G06F 16/254
2008/0066020 A1 * 3/2008 Boss ..................... G06F 40/174 715/780
2008/0129686 A1 * 6/2008 Han ...................... G06F 3/0485 345/156
2008/0270123 A1 * 10/2008 Levanon ................. G10L 17/26 704/E11.002
2009/0189974 A1 * 7/2009 Deering ............. G02B 27/0093 348/51
2009/0195376 A1 * 8/2009 Miller ............... B60R 21/01546 340/457.1
2009/0249253 A1 * 10/2009 Mercer ................. G06F 3/0489 715/827
2009/0282033 A1 * 11/2009 Alshawi .............. G06F 16/9032 707/999.005
2010/0093319 A1 * 4/2010 Sherman ........... H04M 3/42178 455/414.1
2010/0125541 A1 * 5/2010 Wendel ................... G06F 9/451 715/710
2010/0138775 A1 * 6/2010 Kohen ................ G06F 11/3041 715/781
2010/0174599 A1 * 7/2010 Rosenblatt ......... G06Q 30/0237 705/14.37
2010/0174603 A1 * 7/2010 Hughes .................. G06Q 30/02 705/14.42
2010/0180200 A1 * 7/2010 Donneau-Golencer ...................... G06Q 10/10 715/705
2010/0211865 A1 * 8/2010 Fanning .............. G06F 16/9577 715/234
2010/0211893 A1 * 8/2010 Fanning .................... G06F 8/38 715/760
2010/0275118 A1 * 10/2010 Iakobashvili ......... G06F 40/253 715/810
2010/0281390 A1 * 11/2010 Kurtz .................. G06F 3/04812 715/825
2011/0055714 A1 * 3/2011 Vemulapalli .......... G06F 9/5077 718/1
2011/0078259 A1 * 3/2011 Rashad ................ G06Q 10/107 706/54
2011/0078663 A1 * 3/2011 Huang .................. G06F 16/958 717/126
2011/0099474 A1 * 4/2011 Grossman ............... G06F 9/453 715/810
2011/0243313 A1 * 10/2011 Couse ................... H04M 3/382 379/93.02
2011/0261071 A1 * 10/2011 Ganetakos ............ G06Q 10/00 345/619
2011/0270771 A1 * 11/2011 Coursimault ...... H04N 1/00344 705/304
2011/0273589 A1 * 11/2011 Mochimizo ........... H04N 23/68 348/E5.024
2012/0072910 A1 * 3/2012 Martin ................ G06F 9/45533 718/1
2012/0078949 A1 * 3/2012 Allen .................. G06F 16/2465 707/769
2012/0101888 A1 * 4/2012 Rothschild ......... G06Q 30/0623 705/26.61
2012/0117470 A1 * 5/2012 Michelstein ....... G09B 19/0053 715/709
2012/0124035 A1 * 5/2012 Vaidyanathan ..... G06F 16/9038 707/723
2012/0159330 A1 * 6/2012 Jeong ...................... G06F 3/017 715/863
2012/0159345 A1 * 6/2012 Gonsalves ........... G06F 3/0482 715/745
2012/0166495 A1 * 6/2012 Pieruschka ........... G06F 40/143 707/805
2012/0166929 A1 * 6/2012 Henderson ............ G06F 40/174 715/224

(56) References Cited

U.S. PATENT DOCUMENTS

2012/0199645 A1* 8/2012 Rothschild ............ G06F 16/951 235/375
2012/0200574 A1* 8/2012 Hill ........................ G06F 9/453 345/473
2012/0233312 A1* 9/2012 Ramakumar .......... G06Q 40/12 709/224
2012/0240043 A1* 9/2012 Hinckley ................ G06F 9/453 715/705
2012/0246303 A1* 9/2012 Petersen ............. G06F 16/1734 709/224
2012/0265787 A1* 10/2012 Hsu ........................ G06F 16/36 707/E17.014
2013/0019173 A1* 1/2013 Kotler ................. G06F 3/04883 715/834
2013/0055092 A1* 2/2013 Cannon, III .......... G06F 3/0484 715/738
2013/0090103 A1* 4/2013 Kim .................. H04M 1/72463 455/418
2013/0104020 A1* 4/2013 Patterson ................ G06F 40/18 715/219
2013/0127980 A1* 5/2013 Haddick ................. G06F 3/013 348/14.08
2013/0185074 A1* 7/2013 Gruber .................... G06F 3/167 704/257
2014/0006944 A1* 1/2014 Selig ....................... G06F 9/453 715/705
2014/0006991 A1* 1/2014 Kalaidjian ................ G06F 8/74 715/771
2014/0067730 A1* 3/2014 Kozloski ................ G16H 20/70 706/12
2014/0075363 A1* 3/2014 Kritt ..................... G06F 3/0482 715/772
2014/0250055 A1* 9/2014 Kuspa ..................... G06F 16/48 707/E17.014
2014/0282141 A1* 9/2014 Sayed ..................... G06F 9/455 715/765
2014/0359584 A1* 12/2014 Chu ...................... G06F 16/283 717/131
2015/0169530 A1* 6/2015 Otero .................... G06F 40/106 715/219
2015/0363437 A1* 12/2015 Florez ................. G06F 11/0724 707/692
2016/0019197 A1* 1/2016 Iasi ....................... G06F 40/174 715/224
2016/0092598 A1* 3/2016 Mishra ................ G06F 16/9535 707/740
2016/0180352 A1* 6/2016 Chen .................... G06Q 30/016 705/7.29
2016/0209648 A1* 7/2016 Haddick .............. G04G 21/025
2016/0217807 A1* 7/2016 Gainsboro ............ H04M 3/568
2017/0087460 A1* 3/2017 Perry .................... A63F 13/497
2017/0134922 A1* 5/2017 Chiu ....................... G06F 1/163
2017/0168924 A1* 6/2017 Dereszynski ........... H04L 43/50
2017/0192232 A1* 7/2017 Katz .................... G02B 27/017
2017/0236060 A1* 8/2017 Ignatyev .................. G06N 5/01 706/46
2017/0286558 A1* 10/2017 Kelleher ............... G06F 11/323
2017/0315825 A1* 11/2017 Gordon ................. G06F 3/0346
2017/0316707 A1* 11/2017 Lawrenson ............. G06F 3/013
2017/0330099 A1* 11/2017 de Vial .................. G06Q 40/04
2017/0364484 A1* 12/2017 Hayes ................... G06F 40/109
2018/0018311 A1* 1/2018 Mukherjee ........... G06Q 40/123
2018/0052871 A1* 2/2018 Bach ..................... G06F 16/958
2018/0143745 A1* 5/2018 Ashok ................ G06F 16/3325
2018/0183929 A1* 6/2018 Fang .................. H04M 3/5166
2019/0121851 A1* 4/2019 Shires ................... G06F 40/279
2019/0130910 A1* 5/2019 Kariya .................... G10L 15/22
2019/0364154 A1* 11/2019 Hermanek ........... G06Q 10/107
2019/0373336 A1* 12/2019 Kim ..................... H04N 21/233
2020/0005417 A1* 1/2020 Agasi .................. G06F 11/3438
2020/0110755 A1* 4/2020 Waldman .............. G06F 3/0484
2020/0117718 A1* 4/2020 Lundberg .............. G06F 18/214
2020/0167522 A1* 5/2020 Cervelli .................. G06F 40/18
2020/0226418 A1* 7/2020 Dorai-Raj ............. G06F 16/248
2020/0312351 A1* 10/2020 Takahashi ............... G06F 3/167
2020/0394054 A1* 12/2020 Galoso .................... G06F 9/451
2021/0019213 A1* 1/2021 Mestres .............. G06F 11/3438
2021/0026821 A1* 1/2021 Glidden .............. H04L 63/0414
2021/0083961 A1* 3/2021 Polishchuk ............. H04L 43/50
2021/0149963 A1* 5/2021 Agarwal ........... G06F 16/90332
2021/0326523 A1* 10/2021 Walters .................. G06N 3/044
2022/0147377 A1* 5/2022 Matthews ............... G06F 9/453
2022/0300306 A1* 9/2022 Leung ...................... G06N 5/04
2024/0303418 A1* 9/2024 Daniel .................. G06F 40/174

OTHER PUBLICATIONS

“Autocomplete suggestions for text inputs”, Retrieved from https://developers.google.com/apps-script/add-ons/how-tos/suggestions, Apr. 13, 2023, p. 2.
“Configure Recommendation Framework for an incident in Service Operations Workspace”, Retrieved from https://docs.servicenow.com/bundle/utah-it-service-management/page/product/service-operations-workspace/task/configure-rf-properties.html, Feb. 2, 2023, p. 2.
“Create a field recommendation in Recommended Actions”, Retrieved from https://docs.servicenow.com/en-US/bundle/utah-customer-service-management/page/product/customer-service-management/task/ra-csm-field-recs-create.html, Apr. 25, 2023, p. 2.
“Disable Pre-fill for a Form Field”, Retrieved from https://experienceleague.adobe.com/docs/marketo/using/product-docs/demand-generation/forms/form-fields/disable-pre-fill-for-a-form-field.html?lang=en, Jun. 29, 2023, p. 2.
“Exploring Recommendation Framework”, Retrieved from https://docs.servicenow.com/en-US/bundle/utah-it-service-management/page/product/recommendation-framework/concept/explore-recommendation-framework.html, Feb. 2, 2023, p. 2.
“Prefilling a form”, Retrieved from https://www.cognitoforms.com/support/65/data-integration/prefilling-a-form, Jun. 29, 2023, p. 4.
“Understand lookup field”, Retrieved from https://help.zoho.com/portal/en/kb/creator/developer-guide/forms/add-and-manage-fields/articles/fields-lookup-understand#Filter_the_records_that_the_lookup_field_displays, Jun. 28, 2023, p. 5.

* cited by examiner

DISPLAY
712
INPUT DEVICE
714
CURSOR CONTROL
716
MAIN MEMORY
706
ROM
708
STORAGE DEVICE
710
BUS
702
PROCESSOR
704
COMMUNICATION INTERFACE
718
700
NETWORK LINK
720
728
INTERNET
ISP
726
SERVER
730
LOCAL NETWORK
722
HOST
724

FORM FIELD RECOMMENDATION MANAGEMENT

INCORPORATION BY REFERENCE; DISCLAIMER

The following application is hereby incorporated by reference: application No. 63/494,563 filed on Apr. 6, 2023. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to enabling and disabling recommendations for form fields. In particular, the present disclosure relates to comparing data generated based on a user's interaction with a form to a recommendation-enabling criteria to determine whether to present recommendations for form fields.

BACKGROUND

Many applications allow users to interact with, and store, data by interacting with pre-generated forms. For example, a system may provide a user with a form including fields for invoice number, product name, date, and buyer to allow a user to search a database of invoices. The form saves the user time instead of requiring the user to learn all the available fields that are searchable by the user, as well as any logic that may be applied to the fields. For example, a user may want to search for a set of invoices that include a particular product. However, a set of searchable records in a database may not include fields for particular products. By providing a form, a system informs a user, based on the fields present in the form, what fields may be searchable. As another example, a system may require a certain set of data to generate a record. By providing a particular set of fields in a form, the system informs the user which fields are required to generate the record.

With the increased use of algorithms and models to improve search results, users have come to expect increased personalization in their searches. Some systems improve users' experiences when entering data into forms by pre-filling fields of the form with data that the system predicts the user would enter. For example, a system may prefill a "credit card" field with a stored credit card number. Members of business organizations and enterprises expect the same personalization from enterprise applications as they do from nonproprietary applications, such as search engines. However, business enterprises need to be able to manage when an application provides recommendations to a user for entering data into a field and when the application does not.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
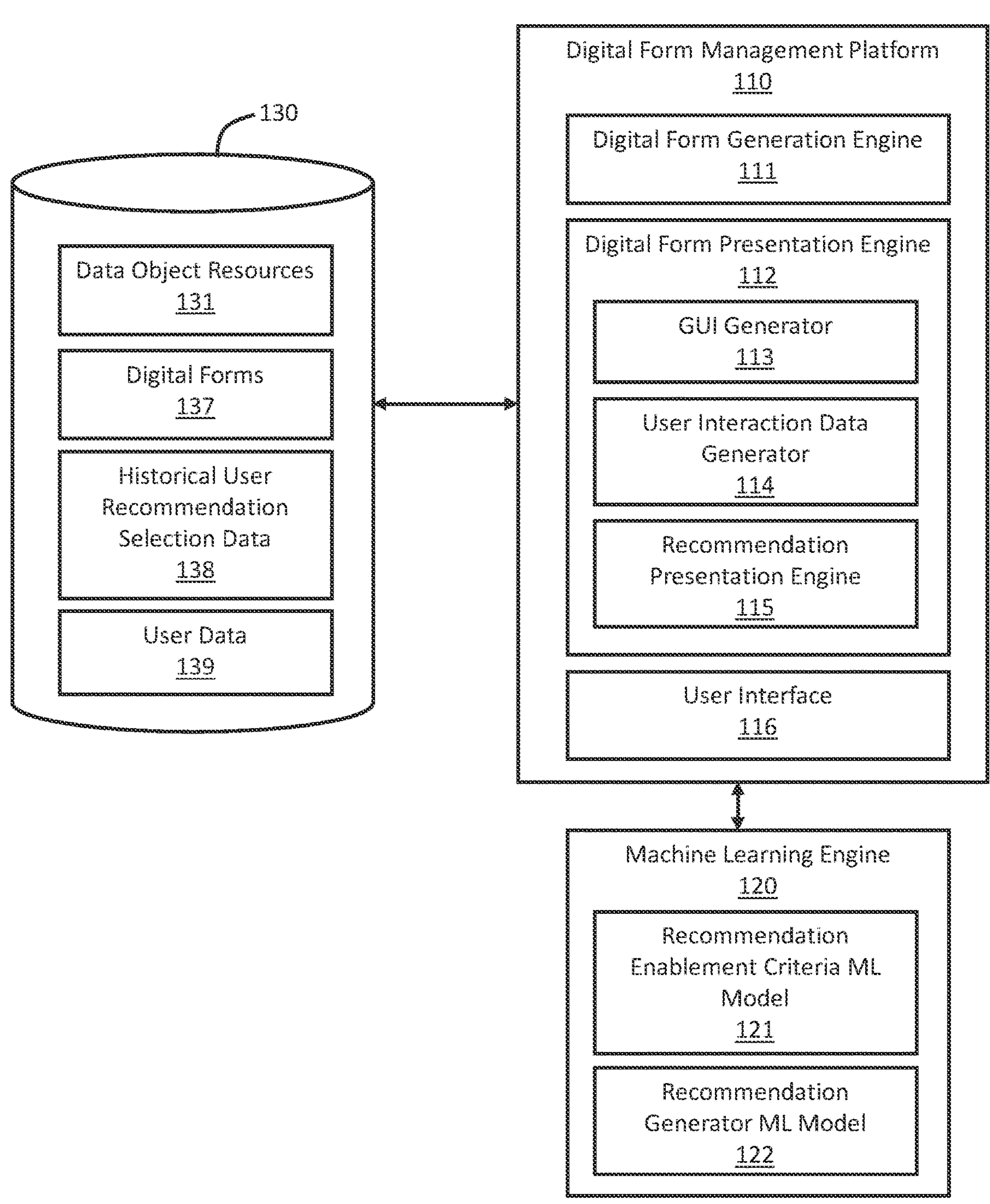
FIGS. 1A and 1B illustrate a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. APPLYING RECOMMENDATION ENABLEMENT CRITERIA TO SELECTIVELY DISPLAY RECOMMENDATIONS FOR FORM FIELDS
4. GENERATING FORMS USING RECOMMENDATION ENABLEMENT CRITERIA FOR FORM FIELDS
5. TRAINING A MACHINE LEARNING MODEL TO GENERATE RECOMMENDATION ENABLEMENT CRITERIA
6. EXAMPLE EMBODIMENT
7. COMPUTER NETWORKS AND CLOUD NETWORKS
8. MISCELLANEOUS; EXTENSIONS
9. HARDWARE OVERVIEW

1. General Overview

One or more embodiments enable or disable recommendations for a data entry field displayed in a GUI based on whether a user's interaction with the GUI meets a recommendation enablement criteria. The recommendation enablement criteria may be stored in metadata associated with the data entry field. For example, the recommendation enablement criteria may be stored in a data object resource associated with the data entry field. If the system determines that a set of recommendation enablement criteria is met, the system presents one or more recommendations in the GUI for the user to select to enter data into the data entry field.

The system may obtain values for the recommendations from the data object resource associated with the data entry field. According to one example, the system applies a machine-learning model to a set of input data to generate one or more recommendations for values that a user may select to enter data into form fields. In an example, the system may execute statically defined recommendation retrieval methods that (a) receive the metadata/information as input parameters and (b) obtain the recommendations from an endpoint defined by the metadata. Alternatively, or in addition, the system may generate code including the recommendation retrieval methods described above.

When a user interacts with a digital form, a system generates a set of user interaction data. The system compares the user interaction data with recommendation enablement criteria obtained from data object resources to determine whether to present or not present recommendations for form fields in the digital form. For example, the user interaction data may indicate that a user has accessed a digital form, has selected a form field, has hovered a cursor over a form field, or has performed an action (such as viewing a digital form or hovering over a form field) for a measured duration of time. The measured duration of time is compared to a threshold amount of time specified by recommendation enablement criteria. When the measured duration of time exceeds the threshold amount of time, the recommendation enablement criteria is met. In another example, the recommendation enablement criteria specifies a user authority level for triggering the enablement of recommendations and/or specifies a user authority level for triggering the disablement of recommendations. In another example, the recommendation enablement criteria specifies a set of historical user behavior that triggers the enablement of recommendations and/or specifies a set of historical user behavior that triggers the disablement of recommendations.

One or more embodiments train a machine learning model to generate recommendation enablement criteria. A system may allow a user to generate or modify recommendation enablement criteria when a user creates or modifies a form including form fields mapped to a particular data object resource. Alternatively, the system may allow the user to generate or modify the recommendation enablement criteria by accessing a particular application for creating or modifying data object resources. The system may train the machine learning model based on a data set including historical recommendations, historical user recommendation selections, historical user-generated recommendation enablement criteria, historical form attributes, and historical data object resource attributes.

One or more embodiments present a GUI for a user to generate a digital form. The system presents in the GUI interface elements that are pre-configured to enable machine-learning-generated recommendations. For example, the system stores, for the pre-configured user interface elements, metadata corresponding to a set of data to be transmitted to a machine learning model, endpoints for sending the data, and information about the recommendations that will be received back from the machine learning model. When a user selects the pre-configured interface elements for inclusion in a form, the system automatically configures the form to allow the machine-learning-generated recommendations for the field. According to one example, the system generates software instructions or code that transmit data to a machine learning model and receive recommendation data from the machine learning model, without requiring the user to write such instructions. For example, the system may generate code specifying a set of data to be transmitted to a machine learning model, endpoints for sending the data when the form is accessed by an end-user, and information about the recommendations that will be received back from the machine learning model to an end-user's device. In another example, the system execute pre-defined methods that accept ML-model configuration attributes, ML-model input, and/or ML-model endpoints as input. The system executes the pre-defined methods to obtain the recommendations from the ML-model.

According to one example, pre-configured interface elements are mapped to attribute fields of business object resources. The business object resources specify recommendation enablement criteria for the attribute fields. When the system stores a newly-created digital form, the system stores a mapping of the form fields to the business object resources. When the system presents a digital form to a user, the system accesses the mapping and the corresponding recommendation enablement criteria in the data object resources to determine whether to present recommendations for the form fields in the digital form.

One or more embodiments described in this Specification and/or recited in the claims may not be included in this General Overview section.

2. System Architecture

Figure 1B:
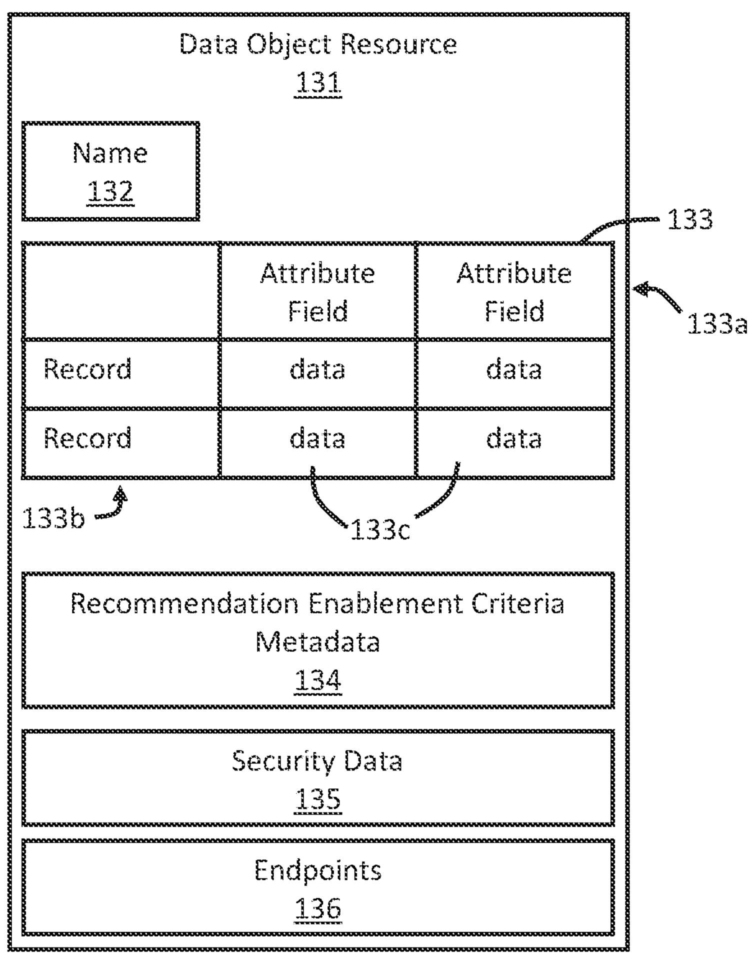

FIGS. 1A and 1B illustrate a system 100 in accordance with one or more embodiments. As illustrated in FIGS. 1A and 1B, system 100 includes a digital form management platform 110, a machine learning engine 120, and a data repository 130. In one or more embodiments, the system 100 may include more or fewer components than the components illustrated in FIGS. 1A and 1B. The components illustrated in FIGS. 1A and 1B may be local to or remote from each other. The components illustrated in FIGS. 1A and 1B may be implemented in software and/or hardware. Each component may be distributed over multiple applications and/or machines. Multiple components may be combined into one application and/or machine. Operations described with respect to one component may instead be performed by another component.

In one or more embodiments, the digital form management platform 110 refers to hardware and/or software configured to perform operations described herein for generating forms that include form fields linked to data object resource fields and for receiving user inputs accessing forms and form fields. Examples of operations for applying recommendation enablement criteria to form fields presented by a digital form management platform 110 are described below with reference to FIG. 2.

In an embodiment, the digital form management platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a mobile handset, a smartphone, a personal digital assistant ("PDA"), a wireless receiver and/or transmitter, a base station, a communication management device, a router, a controller, an access point, and/or a client device.

According to one or more embodiments, the digital form management platform 110 is distributed across multiple networked devices. For example, a client device runs a client application to present digital forms and digital form-generation pages to a user via a graphical user interface (GUI). The client application communicates with a cloud-based application to obtain data object resource data (such as recommendation enablement criteria) and to update a machine learning model for presenting recommendations in form fields. Additional embodiments and/or examples relating to computer networks are described below in Section 7, titled "Computer Networks and Cloud Networks."

The digital form management platform 110 includes a digital form generation engine 111. The digital form generation engine 111 presents a user with a form-generation graphical user interface (GUI). In one or more embodiments, the form-generation GUI is presented via the user interface 116. In one or more embodiments, interface 116 refers to hardware and/or software configured to facilitate communications between a user and the digital form management platform 110. Interface 116 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 116 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 116 is specified in one or more other languages, such as Java, C, or C++.

The digital form generation engine 111 presents a form-generation GUI including a region representing a form to be generated and a region including selectable user interface elements representing fields to be added to the form. The fields to be added to the form are mapped to data object resources 131. For example, a field entitled "employee name" may be mapped to a data object resource 131 including a table with a list of records representing employees. A form field presented in the GUI by the digital form generation engine and entitled "employee class" may be mapped to a "class" header field of the data object resource 131. In one embodiment, a region of a form-generation GUI includes a set of interface elements mapped to fields of data object resources. When a user selects an interface element to create a corresponding form field in a digital form, the form field is mapped to the corresponding data object resource field.

FIG. 1B illustrates an example of a data object resource 131. The data object resource 131 includes a name 132 and a table 133 of values. The table includes header fields 133*a* containing attribute names (also referred to as "attribute fields"). The table 133 includes records 133*b*. Data fields 133*c* contain data values for the records 133*b* corresponding to the attribute fields 133*a*. For example, one attribute field may be "employee name." The data fields 133*c* in the column under "employee name" may include names for the employees associated with the records 133*b*. Another attribute field may include the content "class." The data fields 133*c* in the column under the attribute name "class" may contain employee classes (such as class A, class B, class C, etc.) for the employees corresponding to the records 133*b*.

The data object resource 131 includes recommendation enablement criteria metadata 134. The recommendation enablement criteria metadata 134 specifies, for fields in the table 133, a set of criteria for determining whether an application displaying form fields corresponding to the data in the table 133 should present recommended values to a user accessing a form. The recommendation enablement criteria associated with one field may indicate, for example, that a recommendation function is enabled for the field. A recommendation enablement criteria associated with another field of the same data object resource may indicate that the recommendation function is disabled for the latter field. In addition, or in the alternative, the recommendation enablement criteria may specify that a recommendation function is enabled only when predefined criteria are met. For example, each attribute field 133*a* may be associated with a separate set of recommendation enablement criteria. The system may apply a different recommendation enablement criteria to an "employee name" field than to an "employee class" field.

Recommendation enablement criteria may include, for example, a time threshold. An application presenting a form field may compare an amount of time that has passed since a particular user action to the time threshold to determine whether to present one or more recommendations for entering data in the field. For example, the time threshold may correspond to an amount of time a user has spent on the form, an amount of time that has passed between a user entering data in a first form field and entering data in a second form field, an amount of time that has passed between a user entering data in a first form field and (a) entering data and (b) pressing Enter (or another selection button to confirm the user has completed entering data) in a second form field, an amount of time a cursor has hovered over a form field, or an amount of time that a form field has been visible in a view area of a display device. Recommendation enablement criteria may include user data, such as an employee's position within a company or authorization level. When a detected duration of time for a particular action exceeds the time threshold for the particular action specified in the recommendation enablement criteria, the recommendation is enabled. Recommendation enablement criteria may include a determination whether a user has previously entered data into one or more specified fields in either the same form or a different form from a target form field.

The data object resource 131 further includes security data 135 specifying criteria for permitting users and/or applications to access data in the data object resource 131. For example, the security data 135 may specify authorization levels of employees in a company that may access data stored in the data object resource 131. The security data 135 may specify encryption keys required to be used by applications for accessing the data stored in the data object resource 131.

The data object resource 131 further includes endpoints 136. The endpoints 136 are application programming interface (API) information which may be used by applications to access and/or modify data in the data object resource 131.

The digital form generation engine 111 receives a user selection of an interface element in the form-generation GUI corresponding to a particular form field. The user selection may include a keystroke, a mouse click, a drag-and-drop action using a mouse, trackball, touchpad, or other device interacting with a cursor on a display. According to one example, a user drags a field from a set of possible fields into a region of a GUI representing a form to be generated. The user may position the field at a location in the form where the user wants the field to appear in the form.

Based on the user selection, the digital form generation engine 111 identifies the data object resource 131 associated with the form field. The data object resource may include a single data object resource or a set of data object resources. According to one example embodiment, the interface element corresponding to the selected form field is mapped to column of a data object resource 131.

According to one embodiment, the digital form generation engine 111 allows a user to add or modify recommendation enablement criteria. The recommendation enablement criteria may be stored in metadata associated with the form or in a data object resource 131 mapped to an interface element representing a form field upon selection of the interface element by a user. The digital form generation engine 111 may check a user's authority to modify the data object resource prior to allowing the user to add or modify recommendation enablement criteria. For example, a user may select an interface element and drag the interface element to a form-creation region of a GUI. Upon placing the interface element in the form-creation region, the digital form generation engine 111 may (1) identify the corresponding data object resource 131, (2) check the user's authority level, and (3) generate a prompt asking the user whether the user would like to modify the recommendation enablement criteria for the field in the data object resource 131 that correspond to the selected interface element. If the user enters one or more criteria, the system modifies metadata 134 associated with the attribute field 133*a* in the data object resource 131 to include the user-entered recommendation enablement criteria.

According to one embodiment, based on a user selection of a particular interface element in a GUI, the system applies a machine learning model 121 to generate recommendation enablement criteria for one or more fields of a data object resource 131 mapped to the selected interface element. For example, the system may generate as input data for the machine learning model: user data of the user selecting the interface element and content data in fields of the data object resource mapped to the selected interface element. The system may automatically apply the recommendation enablement criteria to the data object resource attribute field(s) 133*a*. Alternatively, the system may generate a notification in the GUI to allow the user to accept or reject the machine learning model generated recommendation enablement criteria. Based on the result of the user's accepting or rejecting the machine learning model generated recommendation enablement criteria, the system may update the machine learning model for generating future recommendations.

In some examples, one or more elements of the machine learning engine 120 may use a machine learning algorithm to generate recommendation enablement criteria. A machine learning algorithm is an algorithm that can be iterated to learn a target model f that best maps a set of input variables to an output variable, using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, a set of training data includes datasets and associated labels. The datasets are associated with input variables (e.g., user attribute data 139 (such as a user's position in a company or enterprise, a user's past form field entries, a user's historical form field recommendation selections 138, a user's past-generated recommendation criteria) and data object resource attributes (such as values in data object resource fields, types of data contained in the data object resource fields, and security information associated with a data object resource or data object resource fields)) for the target model f. The associated labels are associated with the output variable (e.g., a particular recommendation enablement criteria) of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data.

In an embodiment, a machine learning algorithm can be iterated to learn relationships between user attributes and data object resource attributes and particular recommendation enablement criteria for particular fields in data object resources.

In an example, the machine learning engine 120 initially trains a neural network using a historical data set. Training the neural network includes generating n hidden layers for the neural network and the functions/weights applied to each hidden layer to compute the next hidden layer. The training may further include determining the functions/weights to be applied to the final, n-th hidden layer that compute the final label(s) or prediction(s) for a data point.

Training a neural network includes: (a) obtaining a training data set, (b) iteratively applying the training data set to a neural network to generate labels for data points of the training data set, and (c) adjusting weights and offsets associated with the formulae that make up the neurons of the neural network based on a loss function that compares values associated with the generated labels to values associated with test labels. The neurons of the neural network include activation functions to specify bounds for a value output by the neurons. The activation functions may include differentiable nonlinear activation functions, such as rectified linear activation (ReLU) functions, logistic-type functions, or hyperbolic tangent-type functions. Each neuron receives the values of each neuron of the previous layer, applies a weight to each value of the previous layer, and applies one or more offsets to the combined values of the previous layer. The activation function constrains a range of possible output values from a neuron. A sigmoid-type activation function converts the neuron value to a value between 0 and 1. A ReLU-type activation function converts the neuron value to 0, if the neuron value is negative, and to the output value if the neuron value is positive. The ReLU-type activation function may also be scaled to output a value between 0 and 1. For example, after applying weights and an offset value to the values from the previous layer for one neuron, the system may scale the neuron value to a value between −1 and +1. The system may then apply the ReLU-type activation function to generate a neuron output value between 0 and 1. The system trains the neural network using the training data set, a test data set, and a verification data set until the labels generated by the trained neural network are within a specified level of accuracy, such as 98% accuracy.

The system stores a completed digital form 137 including the selected form field(s) mapped to corresponding data object resources 131. The system may store the digital forms 137 as an executable file, an editable electronic document, a webpage, a proprietary application format, or any other format that allows an application to access the digital file representing the form, generate a visual representation of the form in a GUI, and receive user input in one or more form fields.

The digital form management platform 110 includes a digital form presentation engine 112 to present a digital form 137 in a GUI of the user interface 116, to receive user input in form fields of the digital form, and to store the user input.

The digital form presentation engine 112 presents a digital form 137 including a set of form fields in a GUI. At least one form field corresponds to data stored in a data object resource 131. For example, a form field may ask for a user to enter a "transaction type." The form field may be mapped to a data object resource 131 containing a set of transaction records. The set of transaction records may include an attribute "type" mapped to the form field "transaction type." One digital form 137 may include multiple form fields mapped to (a) multiple different data object resources and/or (b) multiple different fields in a same data object resource. For example, a first form field in a digital form 137 may correspond to a first field in a data object resource 131. A second form field in the digital form 137 may correspond to a second field in the same first data object resource 131. Alternatively, the second form field in the digital form 137 may correspond to a first field in a second data object resource 131.

A user interaction data generator 114 detects a user's interaction with a digital form 137. The user interaction data generator 114 generates a set of user interaction data based on the user interaction. The user interaction data may include data associated with a user's interaction with a digital form 137, generally, and not with any particular form field in the digital form 137, a user's interaction with one or more form fields in the digital form 137, and/or a user's interaction with one or more additional forms 137 associated with the presented digital form 137. For example, a form may include a set of form fields arranged in a left-to-right and top-to-bottom reading order. The user interaction data generator 114 may detect that a user has entered data into a form field preceding a target form field in the reading order, and pressed a key indicating the user had finished entering data into the form field. The user interaction data generator 114 generates user interaction data including a value indicating that the target form field is the next form field in the reading order for the user to complete. In addition, or in the alternative, the user interaction data may include timing data. The system may track how long a display device has displayed a digital form 137 in a GUI, how long a user has spent after entering data in a preceding form field without entering data in a target form field, and/or how long a cursor has hovered over a target form field. User interaction data may combine data associated with a user's interaction with a form and user data, such as a user ID, a user's position within a company, a user's authorization level, and/or data representing a user's past data entry behavior. Data representing the user's past data entry behavior may include, for example, data indicating whether a user has historically selected recommended values for the target form field and/or other form fields.

A recommendation presentation engine 115 compares the user interaction data with form field recommendation criteria corresponding to one or more form fields in a form 137 being displayed to a user to determine whether the user interaction data meets the form field recommendation criteria. In an example, the user interaction data includes data indicating the user has accessed a particular form including a target form field and that the user has selected or hovered over a target form field. In one embodiment, the recommendation presentation engine 115 identifies a field in a data object resource 131 that corresponds to the target form field. The recommendation presentation engine 115 retrieves the recommendation enablement criteria metadata 134 associated with the data object resource field. The recommendation presentation engine 115 compares the user interaction data generated by the user interaction data generator 114 with the retrieved recommendation enablement criteria metadata 134. Based on determining the recommendation enablement criteria is met, the recommendation presentation engine 115 presents one or more recommendations for content that a user may select to enter in the target form field.

According to another example in which the enablement criteria includes a time threshold, the user interaction data generator 114 generates user interaction data including a duration of time that a user has spent entering data into a digital form 137. The recommendation presentation engine 115 compares the time threshold to the measured duration of time to determine whether to present recommendations for data to be entered in the form field.

Based on determining the recommendation enablement criteria has been met, the recommendation presentation engine 115 generates and presents one or more recommended values to a user for entering into a form field. For example, the recommendation presentation engine 115 may present a drop-down menu with terms which may be selected by a user to enter into the form field. Alternatively, the system may display a recommended term in the form field. A user may select the term using a cursor interface, pressing an "Enter" key, a "Tab" key, or by pressing or selecting a specified recommendation-acceptance interface element.

According to one embodiment, the system generates a set of recommendations for entering data into the form field based on applying a set of input data to a recommendation generator machine learning model 122. The input data may include historical user selections associated with the form field and other form fields in the same form and/or in other forms. The input data may include user data including user profile information. User profile information includes a user's position at a company, a user's geographic location, interests, education, expertise, and job description.

In one embodiment, the system stores metadata corresponding to a particular user interface element presented in a form-generation GUI presented by the GUI generator 113. The metadata may include (a) a set of input data to send to the recommendation generator machine learning model 122, (b) a path (e.g., endpoints) for sending the set of input data, (c) authorization data authorizing a particular user and/or device to communicate with the machine learning engine 120, (d) a return path for receiving recommendation data from the recommendation generator machine learning model 122. (e) format data for receiving the recommendation data from the recommendation generator machine learning model 122, and (f) presentation data specifying how recommendations will be presented in the displayed form. In one embodiment, the metadata is stored in a data object resource 131 associated with a particular form field in a digital form, or with a particular user interface element mapped to a particular data object resource 131 and presented in the form-generation GUI. In one example embodiment, the system obtains parameters and values for the metadata based on an application programming interface (API) associated with the machine learning engine 120.

In one embodiment, the digital form management platform 110 uses generative AI to generate software instructions (e.g., code) to obtain recommendations. The software instructions transmit input data to a machine learning model 122 for receiving recommendation data from the machine learning model 122. The use of platform-generated software instructions advantageously removes the need for a user to write the instructions for wiring the digital form management platform 110 to the machine learning model 122. Accordingly, when a form designer uses an AI-enabled UI element, the rendered form that is used by an end-user may include the software instructions to communicate with the machine learning model 122. The software instructions obtain the recommendations for the AI-enabled UI element.

In some examples, one or more elements of the machine learning engine 120 may use a machine learning algorithm to train the recommendation generator machine learning model 122 to generate recommendations for content to enter into a form field.

In an embodiment, a set of training data includes datasets and associated labels. The datasets are associated with input variables (e.g., historical digital form content data, historical form field data, historical data object resource data (e.g., for data objects that correspond to form fields in the historical digital forms), and historical recommendations) for a target model. The associated labels are associated with the output variable (e.g., user-selected recommendations) of the target model. The training data may be updated based on, for example, feedback on the accuracy of the current target model. Updated training data is fed back into the machine learning algorithm, which in turn updates the target model.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the digital form management platform 110. Alternatively, or additionally, a data repository 130 may be implemented or executed on a computing system separate from the digital form management platform 110. A data repository 130 may be communicatively coupled to the digital form management platform 110 via a direct connection or via a network.

Information describing data object resources 131, digital forms 137, historical user recommendation selection data 138, and user data 139 may be implemented across any of components within the system 100. However, this information is illustrated within the data repository 130 for purposes of clarity and explanation.

Figure 2:
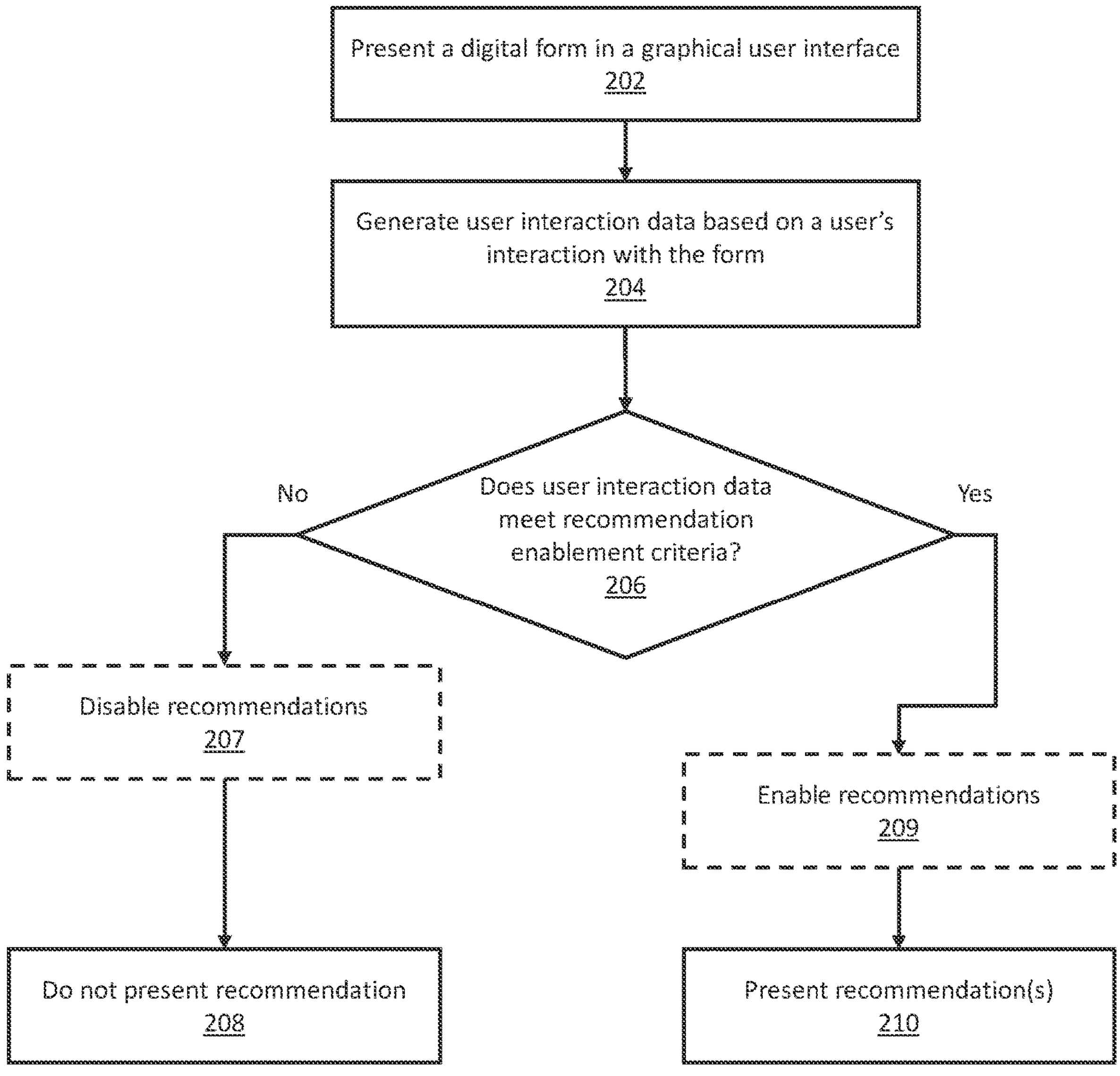
FIG. 2 illustrates an example set of operations for applying recommendation enablement criteria for form fields in accordance with one or more embodiments.

3. Applying Recommendation Enablement Criteria to Selectively Display Recommendations for Form Fields FIG. 2 illustrates an example set of operations for applying recommendation enablement criteria to selectively display recommendations for form fields in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system presents a digital form in a graphical user interface (GUI) (operation 202). The digital form includes a set of form fields. The form fields include editable fields, or fields configured to receive user input. Other portions of the form may be non-editable by an end-user accessing the form. In one embodiment, the form fields correspond to data object resources. One digital form may be associated with one data object resource or with multiple different data object resources. For example, a first field in the form may correspond to a first field in a data object resource. A second field in the form may correspond to a second field in the same first data object resource. Alternatively, the second field in the form may correspond to a first field in a second data object resource.

For example, a digital form may include one form field associated with an employee ID label. The form field may be mapped to an "Employee ID" attribute field of a data object resource. If a system generates recommendations for entering values into the form field, the system may obtain the recommendations from a set of values in an Employee ID column corresponding to the Employee ID attribute field of the data object resource. The digital form may include another form field associated with a product label. If a system generates recommendations for entering values into the form field, the system may obtain the recommendations from a set of values in a "Product" column corresponding to a "Product" attribute field of the data object resource.

The data object resources include fields for storing data which may be searchable by and/or modifiable by users and applications performing queries and searches to identify data stored in the data object resources. The data object resources also store metadata defining properties of the data object resources. The metadata may not be modifiable by users performing searches of data stored in the data object resources. Instead, a user may modify the metadata by accessing a data object resource via a data object resource modification application. According to one embodiment, the metadata includes a field recommendation enablement criteria (referred to herein as "recommendation enablement criteria"). In one embodiment, the recommendation enablement criteria specify whether and/or when a recommendation function is enabled for a particular attribute field. In one embodiment, each attribute field of a data object resource is associated with a respective recommendation enablement criteria. The recommendation enablement criteria associated with one attribute field may indicate, for example, that a recommendation function is enabled for the attribute field. A recommendation enablement criteria associated with another attribute field of the same data object resource may indicate that the recommendation function is disabled for the latter attribute field. In addition, or in the alternative, the recommendation enablement criteria may specify that a recommendation function is enabled only when predefined criteria are met.

Field recommendation enablement criteria may include a time threshold. An application presenting a form field may compare a specified amount of time to the time threshold to determine whether to present one or more recommendations for entering data in the field. For example, the time threshold may correspond to an amount of time a user has spent on the form, an amount of time that has passed between a user entering data in a first form field and entering data in a second form field, an amount of time that has passed between a user entering data in a first form field and (a) entering data and (b) pressing Enter (or another selection button to confirm the user has completed entering data) in a second form field, an amount of time a cursor has hovered over a form field, or an amount of time that a form field has been visible in a view area of a display device. Recommendation enablement criteria may include user data, such as an employee's position within a company or authorization level. Recommendation enablement criteria may include a determination whether a user has previously entered data into one or more specified fields in either the same form or a different form from a target form field.

In addition, or in the alternative, one or more form fields may not be mapped to data object resources. For form fields that are not mapped to data object resources, the system stores metadata configuring the form fields to transmit data to a recommendations-generating machine learning model and to obtain recommendations from the model. For example, the system may store the metadata in a portion of the digital file that stores form presentation data. In addition, or in the alternative, the system may store the metadata in one or more files or tables mapped to the digital form.

Based on a user's interaction with the digital form presented in the GUI, the system generates a set of user interaction data (Operation 204). The user interaction data may include data associated with a user's interaction with a form, generally, and not with any particular form field in the form, a user's interaction with one or more form fields in the form, and/or a user's interaction with one or more additional forms associated with the presented form. For example, the form may include a set of form fields arranged in a left-to-right and top-to-bottom reading order. A system may detect that a user has entered data into a form field preceding a target form field in the reading order, and pressed a key indicating the user had finished entering data into the preceding form field. The user interaction data may include data indicating that the target form field is the next form field in the reading order for the user to complete. In addition, or in the alternative, the user interaction data may include timing data. The system may track how long a user has spent on a form, how long a user has spent after entering data in a preceding form field without entering data in a target form field, and/or how long a cursor has hovered over a target form field. User interaction data may combine data associated with a user's interaction with a form and user data, such as a user ID, a user's position within a company, a user's authorization level, and/or data representing a user's past data entry behavior. Data representing the user's past data entry behavior may include, for example, data indicating whether a user has historically selected recommended values for the target form field and/or other form fields.

The system compares the user interaction data with the form field recommendation criteria to determine whether the user interaction data meets the form field recommendation criteria (Operation 206). According to an example in which the enablement criteria includes a time threshold, the system compares the time threshold to a measured duration of time to determine whether to present recommendations for data to be entered in the form field. For example, the system may compare the time threshold to an amount of time a user has spent on the form, an amount of time that has passed between a user entering data in a first form field and entering data in a second form field, an amount of time that has passed between a user entering data in a first form field and (a) entering data and (b) pressing Enter (or another selection button to confirm the user has completed entering data) in a second form field, an amount of time a cursor has hovered over a form field, or an amount of time that a form field has been visible in a view area of a display device.

According to another example in which the recommendation enablement criteria include user data, such as an employee's position within a company or authorization level, the system determines that the user has accessed a form with the target form field and compares the user's authorization level with an authorization level specified in metadata stored in a data object resource associated with the target form field. Based on the comparison of the user's authorization level to a specified authorization level, the system determines whether to present recommended data to be entered into the target form field.

According to another example in which the recommendation enablement criteria include form field entry history data, the system compares a user's history of entering data into form fields with the recommendation enablement criteria to determine whether to present recommended data to be entered into the target form field. For example, the recommendation enablement criteria may specify that the system should present recommendations only if the user has selected a recommended value at least 25% of the times that the system has recommended a value. Alternatively, the recommendation enablement criteria may specify that the system should present recommendations only if the user has previously entered data into the target form field in the same form, or in different forms, a predefined number of times. For example, the recommendation enablement criteria may specify that if the user has previously entered data into the target form field in the same form fewer than three times, the system should not present recommended data to be entered into the target form field. According to yet another example, the form field entry history data may include data about previously entered values into the form field, by the user and/or by other users. For example, the recommendation enablement criteria may specify that if the user and/or other users have not entered the same value into the field more than a threshold number of times, the system should not present recommended data to be entered into the target form field. For example, if one or more users have historically entered the terms "tag", "plus", "special", "division", "organization", and "regular" into a particular form field of a particular form, and if none of the terms have been entered more than once, the system may compare the historical field entry data with a criteria specifying a term must be entered into a field at least twice and determine that the criteria has not been met. On the other hand, if two users entered the term "tag" and one user entered the term "special" three times, the system may determine that for the terms "tag" and "special", the recommendation enablement criteria has been met.

According to yet another example, the recommendation enablement criteria includes one set of criteria for generating pre-defined recommendations and another set of criteria for generating machine-learning generated recommendations. For example, recommendation enablement criteria may specify that if a user has entered data into form fields mapped to a particular attribute field of a data object resource at least ten times, the system may generate machine-learning recommendations for entering data into a form field corresponding to the particular attribute field. If the user has entered data into form fields mapped to the particular attribute field of the data object resource fewer than ten times, the system may generate pre-defined recommendations for entering data into a form field corresponding to the particular attribute field.

In one embodiment, when the system determines that the user interaction data meets the recommendation enablement criteria in Operation 206, a recommendation configuration component enables recommendations (Operation 209). For example, in one embodiment if the system determines in Operation 206 that the recommendation enablement criteria stored in a data object resource field have been met, the system may set a value for a "recommendations enablement" flag or variable to indicate recommendations are "enabled".

Subsequent to Operation 209, the recommendation presentation engine determines whether recommendations have been enabled for the form field. For example, the recommendation presentation engine determines that a flag, associated with the form field, is set to 1. Based on the flag value 1 corresponding to enablement of recommendations, the recommendation presentation engine determines that recommendations are enabled for the field. The recommendation presentation engine obtains the recommendations and thereafter, presents the recommendations (Operation 210). For example, the system may present a drop-down menu with terms which may be selected by a user to enter into the form field. Alternatively, the system may display a recommended term in the form field. A user may select the term using a cursor interface, pressing an "Enter" key, a "Tab" key, or by pressing or selecting a specified recommendation-acceptance interface element. The system may generate a set of user-customized recommendations, for example, by applying a recommendation-generating machine learning model to a set of input data associated with the user.

According to one embodiment, the system generates a set of recommendations for entering data into the form field based on applying a set of input data to a machine learning model. The input data may include historical user selections associated with the form field and other form fields in the same form and/or in other forms. The input data may include user data including user profile information. User profile information includes a user's position at a company, a user's geographic location, interests, education, expertise, and job description.

When the system determines that the user interaction data does not meet the recommendation enablement criteria in Operation 206, a recommendation configuration component disables recommendations (Operation 207). For example, in one embodiment if the system determines in Operation 206 that the recommendation enablement criteria stored in a data object resource field have not been met, the system may set a value for a "recommendations enablement" flag or variable to indicate recommendations are "disabled." In one embodiment, when the recommendations are disabled, the system refrains from generating recommendations and refrains from presenting recommendations.

Subsequent to Operation 207, the recommendation presentation engine determines whether recommendations have been enabled for the form field. For example, the recommendation presentation engine determines that a flag, for the form field, is set to 0. Based on the flag value 0 corresponding to disablement of recommendations, the recommendation presentation engine determines that recommendations are not enabled for the field. The recommendation presentation engine refrains from presenting any recommendations (Operation 208). In addition, the system may refrain from generating any recommendations for the field since the recommendations are not to be presented.

4. Generating Forms Using Recommendation Enablement Criteria for Form Fields

Figure 3:
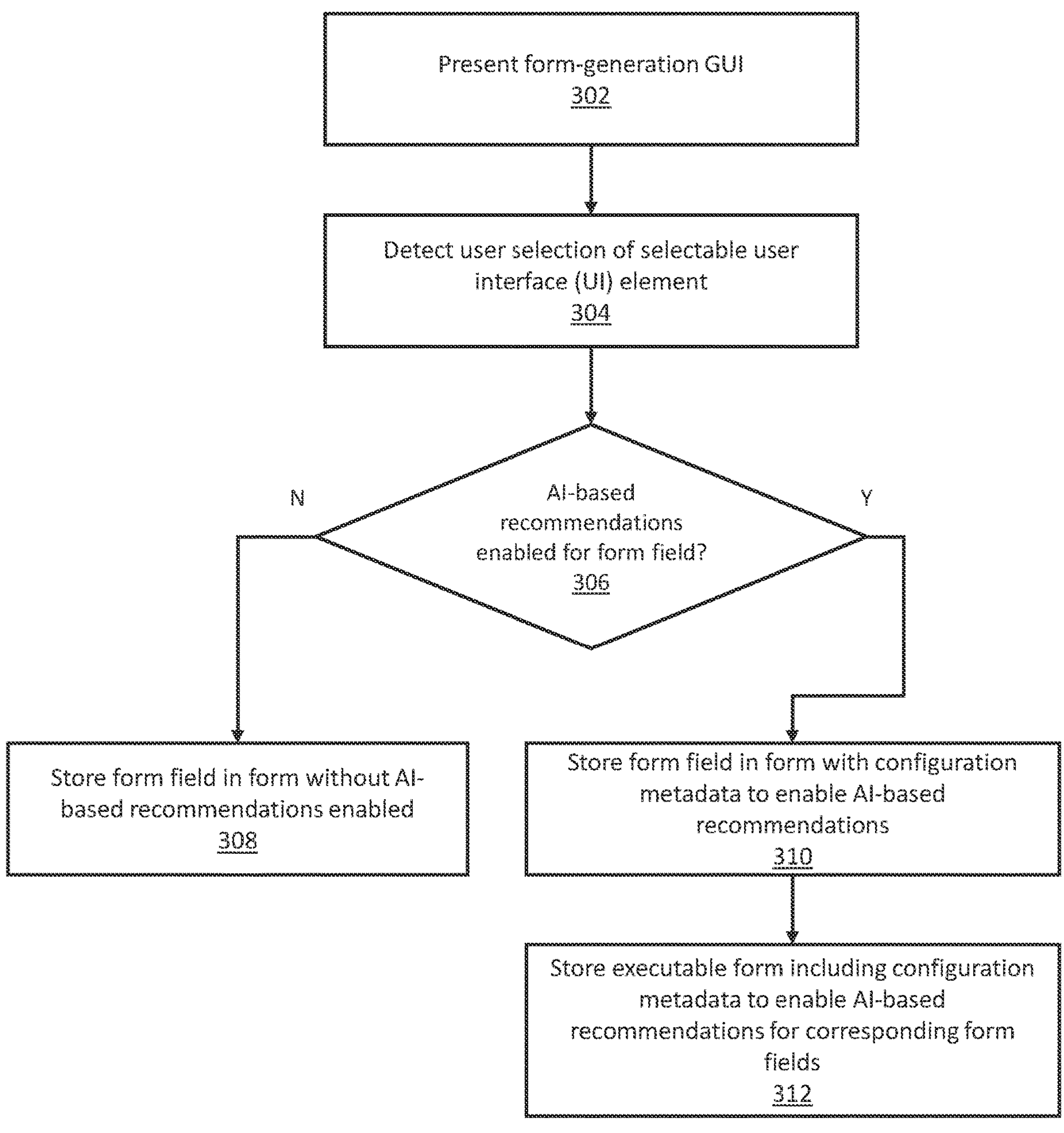
FIG. 3 illustrates an example set of operations for generating a form using recommendation enablement criteria for fields in the form in accordance with one or more embodiments.

FIG. 3 illustrates an example set of operations for generating forms using recommendation enablement criteria for form fields in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

A system presents a user with a form-generation GUI (Operation 302). The form-generation GUI includes a region representing a form to be generated, and a region including selectable user interface (UI) elements representing fields to be added to the form. The selectable user interface elements may be configured to allow machine-learning-based recommendations for content a user may enter into the field (also referred to as artificial-intelligence (AI)-based recommendations). For example, one set of UI elements corresponding to form fields may be pre-configured to provide AI-based recommendations when the form fields are included in a form. Preconfiguring the form fields may include: storing metadata associated with the fields specifying (a) a set of data to transmit to a recommendation-generating machine learning model, (b) a path to send the set of data, (c) a set of data to be received from the recommendation-generating machine learning model, and (d) a mechanism for displaying the AI-based recommendations received from the recommendation-generating machine learning model.

In one embodiment, UI elements representing form fields to be added to the form are mapped to attribute fields of data object resources. For example, a field entitled "employee name" may be mapped to a data object resource including a list of employees. A field entitled "employee class" may be mapped to a "Class" attribute field of a set of employee-type data object resources. Each employee-type data object resource may include fields for a name, a position, a class, and contact information. A company may store a set of 100 employee-type data object resources corresponding to 100 employees. The "employee class" interface element in the form generation GUI may be mapped to the set of 100 employee-type data object resources. If a field recommendation function is enabled for the "Class" attribute field in the data object resource mapped to the "employee class" form field, the system may generate the recommendation(s) from the values stored in the "Class" fields of the 100 employee-type data object resources. In addition, the system may generate recommendations from values that were previously entered in a form field that may not be stored in the "Class" fields of the data object resources. In addition, or in the alternative, the system may generate the recommendation based on providing a set of input data to a machine learning model trained with a data set including the one or both of (a) historical user entries in a form, and (b) class data for the 100 employees. In one embodiment, the historical user entries in the form include both entries generated by a current user accessing the form and entries generated by other users accessing the form. In one example embodiment, a particular form field may be used across multiple different forms. For example, a form field associated with employee names and mapped to employee-type data object resources may be used in a requisition request form and in a reimbursement form. In this example, the historical user entries used to train the recommendations-generating machine learning model may be obtained from multiple users accessing the same form field across multiple different types of forms.

The system receives a user selection of a UI element corresponding to a particular form field (Operation 304). The user selection may include a keystroke, a mouse click, a drag-and-drop action using a mouse, trackball, touchpad, or other device interacting with a cursor on a display. According to one example, a user drags a UI element from a set of possible fields into a region of a GUI representing a form to be generated. The user may position the UI element at a location in the form where the user wants the field to appear in the form.

Based on the user selection, the system determines whether AI-based recommendations are enabled for the selected UI element (Operation 306). The system analyzes the metadata associated with the UI element to determine whether the AI-based recommendations are enabled for the form field. For example, a set of metadata associated with a UI element may include a "recommendations enabled/disabled" flag. If the flag is set at one value (e.g., 1), the system determines that recommendations are enabled for the field. If the flag is set to another value (e.g., 0), the system determines that recommendations are disabled for the field.

In one example embodiment, the UI element may be associated with recommendation enablement criteria. The criteria may specify conditions which, if met at run-time when an end-user accesses the rendered form, the system enables AI-based recommendations. If the conditions are not met at run-time when an end-user accesses the rendered form, the system disables AI-based recommendations.

According to one embodiment, determining whether AI-based recommendations are enabled for a form field associated with a UI element includes analyzing a field of a data object resource mapped to the UI element. For example, the system may identify a data object resource associated with the UI element. The data object resource may include a single data object resource or a set of data object resources. According to one example embodiment, the UI element corresponding to the selected form field is mapped to an attribute field of a data object resource. The attribute field may be a column header that specifies an attribute for values in the column. Rows in the data object resource represent records. The data object resource includes: a set of fields containing data values, security data describing criteria for accessing the data object resource, endpoint data describing endpoints that may be used by applications to access data in the data object resource, and data field recommendation enablement values specifying whether recommendations are enabled for a field. In one embodiment, a data object resource includes a recommendation enablement criteria for a column of fields. The recommendation enablement criteria specifies whether and/or under what conditions an application presenting a data entry field mapped to the column of fields may present recommended values for entering data into a form field.

According to one embodiment, the system allows a user to add or modify recommendation enablement metadata associated with a selected UI element upon selection of the UI element by a user. For example, when a user selects a particular UI element, the system may determine (a) whether AI-based recommendations are pre-configured for the form field corresponding to the UI element, (b) whether AI-based recommendations may be configured upon selection of the corresponding UI element by the user, or (c) whether AI-based recommendations are not permitted for the form field corresponding to the UI element selected by the user. If the system determines that AI-based recommendations are permitted but not yet configured, the system may present a GUI to allow the user to configure AI-based recommendations. For example, the system may allow the user to set a recommendation-enablement flag to "1" or "0," to associated a form field with a particular data object resource field that is pre-configured to permit or not permit AI-based recommendations, or to provide a set of recommendation enablement criteria specifying when to allow AI-based recommendations for the form field.

According to one example embodiment, the system may check a user's authority to modify the data object resource prior to allowing the user to add or modify recommendation enablement criteria. For example, a user may select an interface element and drag the interface element to a form-creation region of a GUI. Upon placing the interface element in the form-creation region, the system may (1) identify the corresponding data object resource, (2) check the user's authority level, and (3) generate a prompt asking the user whether the user would like to modify the recommendation enablement criteria for the field (such as the column of fields) in the data object resource that correspond to the selected interface element. If the user enters one or more criteria, the system modifies metadata associated with the column of fields in the data object resource to include the user-entered recommendation enablement criteria.

According to one embodiment, based on a user selection of a particular interface element in a GUI, the system applies a machine learning model to generate recommendation enablement criteria for one or more fields of a data object resource mapped to the selected interface element. For example, the system may generate as input data for the machine learning model: user data of the user selecting the interface element and content data in fields of the data object resource mapped to the selected interface element. The system may automatically apply the recommendation enablement criteria to the data object resource field(s). Alternatively, the system may generate a notification in the GUI to allow the user to accept or reject the machine learning model generated recommendation enablement criteria. Based on the result of the user's accepting or rejecting the machine learning model generated recommendation enablement criteria, the system may update the machine learning model for generating future recommendations.

If the system determines that AI-based recommendations are not enabled for a particular form field associated with a selected UI element, the system stores the form field in the digital form without metadata enabling AI-based recommendations (Operation 308). For example, the system may store data specifying a size of a form field and data that may be entered into the form field without storing data identifying a path to a recommendation-generating machine learning model.

If the system determines that AI-based recommendations are enabled for a particular form field associated with a selected UI element, the system stores the form field in the digital form with metadata enabling AI-based recommendations (Operation 310). As discussed above, the metadata may indicate (a) AI-based recommendations are always enabled, or (b) AI-based recommendations are enabled when particular recommendation enablement conditions have been met.

The system stores the form including form field(s) associated with selected UI elements (Operation 312). The system stores metadata associated with the form fields indicating whether recommendations are permitted or not permitted for the form fields. In one embodiment, the system stores the metadata in digital file together with digital data representing the form. In one embodiment, the system stores a mapping of form fields to corresponding data object resource attribute field(s).

In one embodiment, when the system generates a form in which a user has selected an AI-enabled UI element, the system generates software instructions or code that transmit data to a machine learning model and receive recommendation data from the machine learning model, without requiring the user to write such instructions. The system stores the software instructions or code together with the digital form. When an end user interacts with the form, the system executes the code, without the end-user having to generate the instructions or code. The system may store the form as an editable electronic document, a webpage, a proprietary application format, or any other format that allows an application to access the digital file representing the form, generate a visual representation of the form in a GUI, and receive user input in one or more form fields. Alternatively, or additionally, the system may execute a pre-defined method that accepts as input ML-model configuration information, ML-model input, and/or an ML-model endpoint for transmission of requests. The system executes the pre-defined method to obtain recommendation data from the ML-model.

Figure 4:
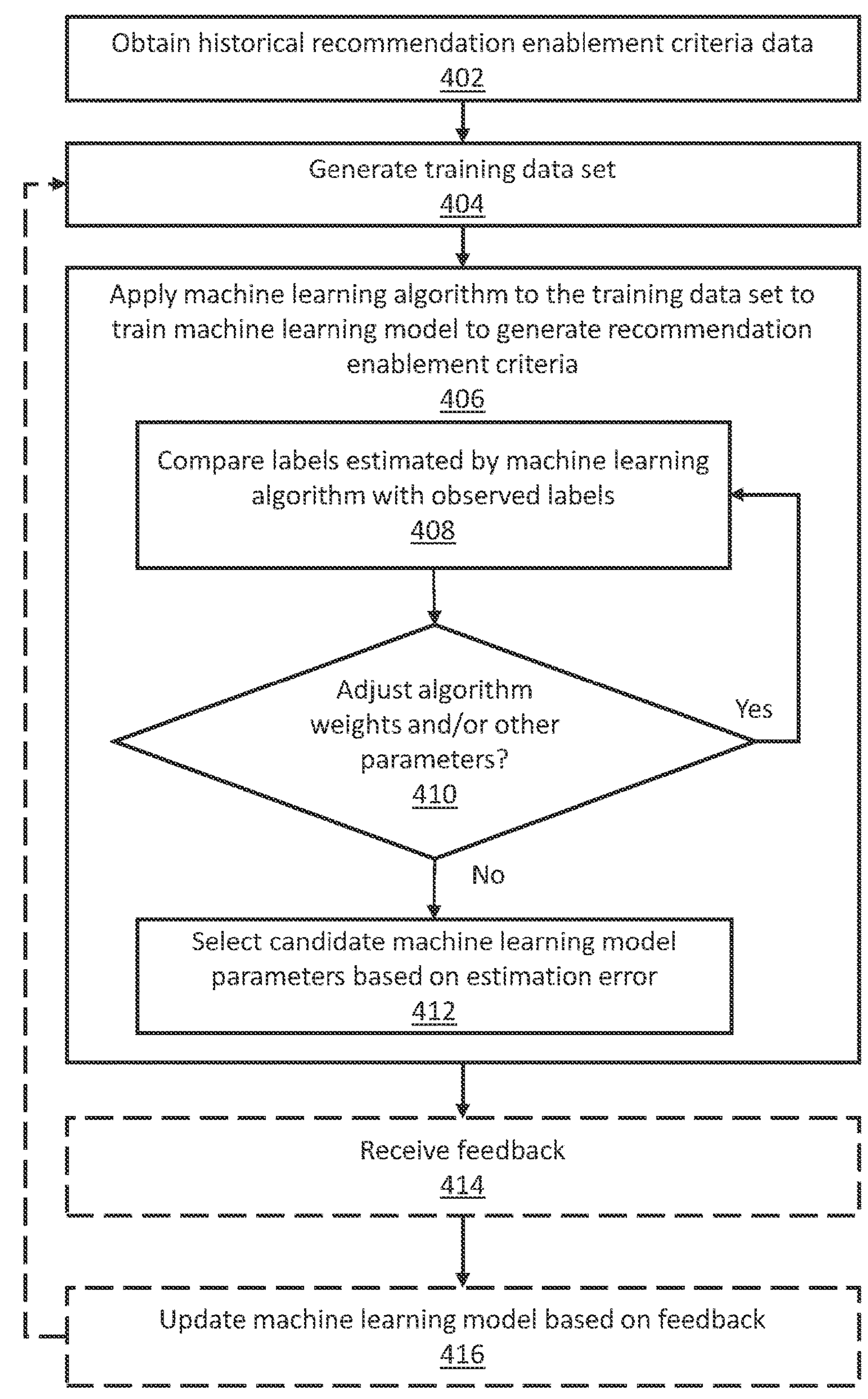
FIG. 4 illustrates an example set of operations for training a machine learning model to generate recommendation enablement criteria in accordance with one or more embodiments.

5. Training a Machine Learning Model to Generate Recommendation Enablement Criteria FIG. 4 illustrates an example set of operations for training a machine learning model to generate recommendation enablement criteria in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In some embodiments, a system (e.g., one or more components of system 100 illustrated in FIG. 1) obtains historical recommendation enablement criteria data (Operation 402). Obtaining the historical recommendation enablement criteria data may include: obtaining historical selections of (a) recommendation enablement criteria and corresponding (b) data object resource fields. The data regarding recommendation enablement criteria includes the type of recommendation enablement criteria applied to a field and/or whether recommendations were enabled in connection with the field. The data regarding the data object resource fields includes data content of the fields (such as whether fields contain words, numbers, codes, links, instructions).

The system uses the historical recommendation enablement criteria data to generate a set of training data (Operation 404). The set of training data includes, for a particular data object resource field (such as a column header specifying a data object resource attribute for a column of fields), at least one classification label. The classification label specifies a historical recommendation enablement criteria. For example, the system may identify in the historical data a data object resource including three data columns and 100 records arranged in rows. The system may further identify in the historical data a recommendation enablement criteria associated with a column header field for each of the columns. For one column, the recommendation enablement criteria may be a flag set to prevent generating recommendations for form fields associated with the column header field. For a second column, the recommendation enablement criteria may be a flag that indicates recommendations are enabled for form fields associated with the column header field. For a third column, the recommendation enablement criteria may be a time threshold that indicates recommendations are enabled for form fields associated with the column header field after a user has hovered over the corresponding form field for a defined duration of time.

According to one embodiment, the system obtains the historical data and the training data set from a data repository storing labeled data sets. The training data set may be generated and updated by data object resource management platform. Alternatively, the training data set may be generated and maintained by a third party. According to one embodiment, the system generates the labeled set of data by parsing electronic forms and generating labels based on parsed values in the documents.

In some embodiments, generating the training data set includes generating a set of feature vectors for the labeled examples. A feature vector for an example may be n-dimensional, where n represents the number of features in the vector. The number of features that are selected may vary depending on the particular implementation. The features may be curated in a supervised approach or automatically selected from extracted attributes during model training and/or tuning. Example features include information about data object resources, forms including fields associated with the data object resources, and users accessing the form fields. Information about data object resources includes: a number of fields, data content in the fields, a number of column header fields, data content in column header fields, and security settings for the data object resources. Information about forms include: a number of forms that are mapped to a particular data object resource, a number of form fields within a form that are mapped to fields of data object resources, a type of form, form identifiers, and types of data the form is designed to collect. Information about users includes historical recommendation selections by users, historical recommendation enablement criteria generated or selected by users, and user profile information. In some embodiments, a feature within a feature vector is represented numerically by one or more bits. The system may convert categorical attributes to numerical representations using an encoding scheme, such as one-hot encoding, label encoding, and binary encoding. One-hot encoding creates a unique binary feature for each possible category in an original feature. In one-hot encoding, when one feature has a value of 1, the remaining features have a value of 0. For example, if a data object resource column header field has ten different possible values, the system may generate ten different features of an input data set. When one category is present (e.g., value "1"), the remaining features are assigned a value "0." According to another example, the system may perform label encoding by assigning a unique numerical value to each category. According to yet another example, the system performs binary encoding by converting numerical values to binary digits and creating a new feature for each digit.

The system applies a machine learning algorithm to the training data set to train the machine learning model (Operation 406). For example, the machine learning algorithm may analyze the training data set to train neurons of a neural network with particular weights and offsets to associate particular data object resource column header fields with particular recommendation enablement criteria.

In some embodiments, the system iteratively applies the machine learning algorithm to a set of input data to generate an output set of labels, compares the generate labels to pre-generated labels associated with the input data, adjusts weights and offsets of the algorithm based on an error, and applies the algorithm to another set of input data. In some cases, the system may generate and train a candidate recurrent neural network model, such as a long short-term memory (LSTM) model. With recurrent neural networks, one or more network nodes or "cells" may include a memory. A memory allows individual nodes in the neural network to capture dependencies based on the order in which feature vectors are fed through the model. The weights applied to a feature vector representing one expense or activity may depend on its position within a sequence of feature vector representations. Thus, the nodes may have a memory to remember relevant temporal dependencies between different data object resource header fields. As another example, one or more nodes may apply different weights if a data object resource header field is unique or a duplicate of another data object resource header field. Additionally, or alternatively, the system may generate and train other candidate models, such as support vector machines, decision trees, Bayes classifiers, and/or fuzzy logic models, as previously described.

In some embodiments, the system compares the labels estimated through the one or more iterations of the machine learning model algorithm with observed labels to determine an estimation error (Operation 408). The system may perform this comparison for a test set of examples, which may be a subset of examples in the training dataset that were not used to generate and fit the candidate models. The total estimation error for a particular iteration of the machine learning algorithm may be computed as a function of the magnitude of the difference and/or the number of examples for which the estimated label was wrongly predicted.

In some embodiments, the system determines whether to adjust the weights and/or other model parameters based on the estimation error (Operation 410). Adjustments may be made until a candidate model that minimizes the estimation error or otherwise achieves a threshold level of estimation error is identified. The process may return to Operation 408 to make adjustments and continue training the machine learning model.

In some embodiments, the system selects machine learning model parameters based on the estimation error meeting a threshold accuracy level (Operation 412). For example, the system may select a set of parameter values for a machine learning model based on determining that the trained model has an accuracy level for generating recommendation enablement criteria that are accepted by a user of at least 98%.

In some embodiments, the system trains a neural network using backpropagation. Backpropagation is a process of updating cell states in the neural network based on gradients determined as a function of the estimation error. With backpropagation, nodes are assigned a fraction of the estimated error based on the contribution to the output and adjusted based on the fraction. Additionally, or alternatively, the system may train other types of machine learning models. For example, the system may adjust the boundaries of a hyperplane in a support vector machine or node weights within a decision tree model to minimize estimation error. Once trained, the machine learning model may be used to generate labels for new examples of data object resource fields.

In embodiments in which the machine learning algorithm is a supervised machine learning algorithm, the system may optionally obtain feedback on the various aspects of the analysis described above (Operation 414). For example, the feedback may affirm or revise labels generated by the machine learning model. The machine learning model may indicate that a particular data object resource field is associated with a label to apply a time-based threshold as a recommendation enablement criteria for the data object resource field. The system may receive feedback indicating that the particular data object resource field should instead be associated with a flag-type criteria to always allow recommendations. Based on the feedback, the machine learning training set may be updated, thereby improving its analytical accuracy (Operation 416). Once updated, the system may further train the machine learning model by optionally applying the model to additional training data sets.

6. Example Embodiments

A detailed example is described below for purposes of clarity. Components and/or operations described below should be understood as one specific example which may not be applicable to certain embodiments. Accordingly, components and/or operations described below should not be construed as limiting the scope of any of the claims.

Figure 5A:
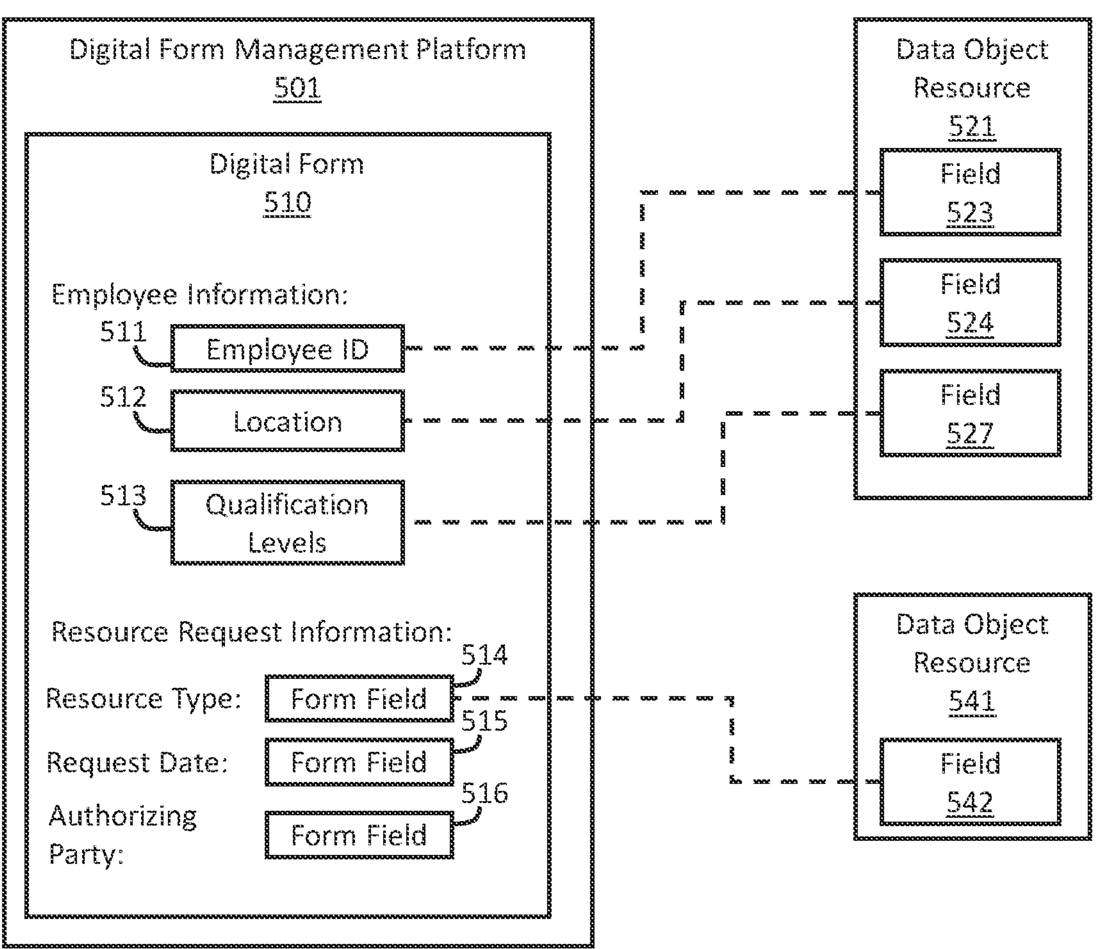
FIGS. 5A-5E illustrate an example embodiment for generating and applying recommendation enablement criteria for form fields.

FIG. 5A illustrates a digital form 510 displayed in a GUI of a digital form management platform 501. The digital form includes form fields 511, 512, 513, 514, 515, and 516. The form fields are selectable by a user to enter data into the form fields. For example, a user may select the form field 511 with a cursor and type a value into the form field. The form is generated to request particular types of information. A user generating the form with an application, such as the digital form generation engine 111 of FIG. 1, may specify with text or images the type of data expected in the form field. In the example illustrated in FIG. 5A, a form generator has included text in the fields 511-516 specifying data to be entered in the fields by a user. For example, the form field 511 includes the text "Employee ID," indicating the form field 511 has been configured to receive a value associated with an employee ID. The form field 512 includes the text "location," indicating the form field 512 has been configured to receive a value associated with a location.

Figure 5B:
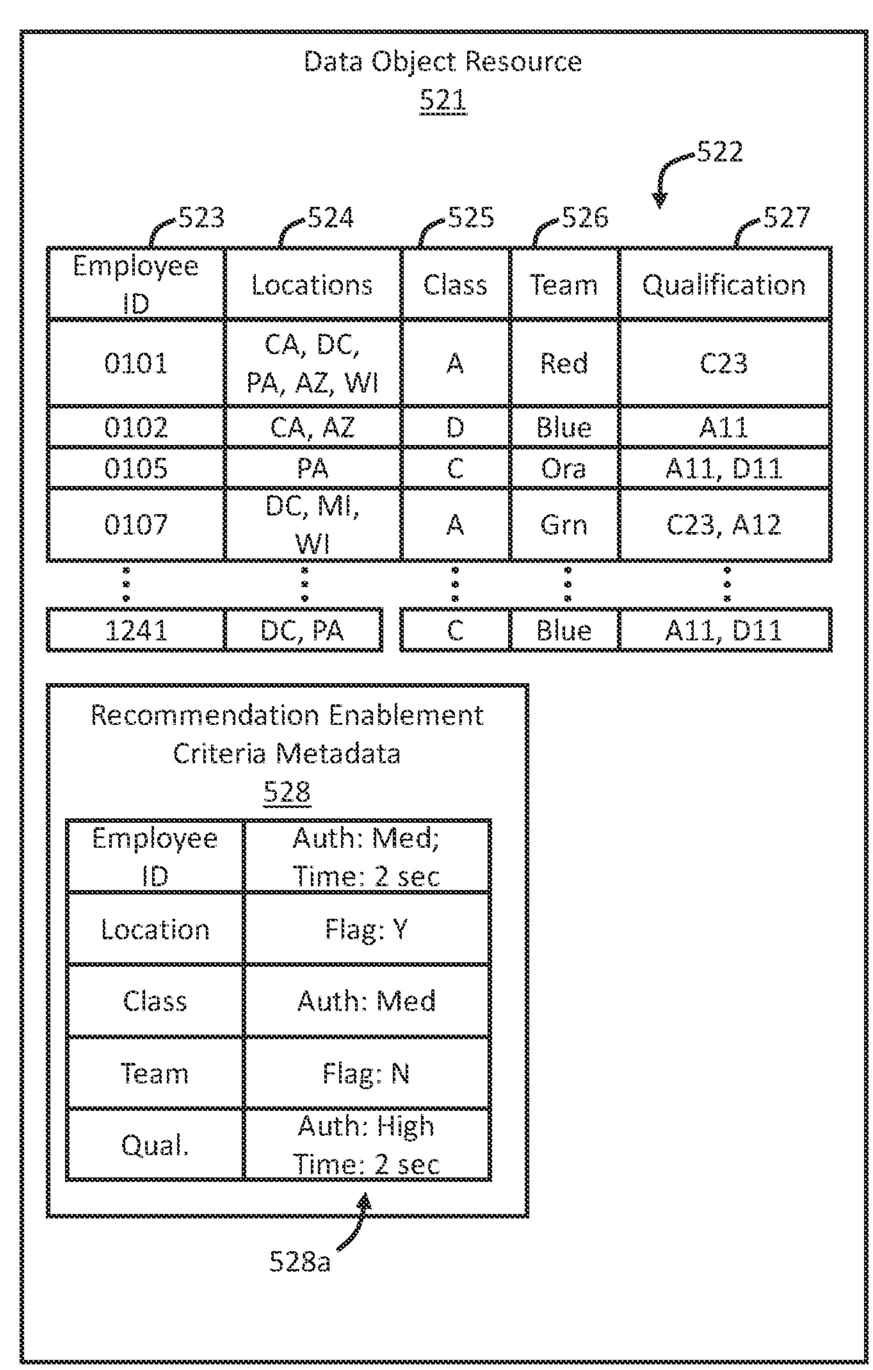

The form fields 511, 512, 513, and 514 are mapped to fields 523, 524, 527, and 542 in data object resources 521 and 541. Form fields 515 and 516 are not mapped to any data object resource fields. FIG. 5B illustrates an example of features of the data object resource 521.

The data object resource 521 includes a table 522 and recommendation enablement criteria metadata 528. The table 522 includes attribute fields 523, 524, 525, 526, and 527. Attribute field 523 specifies an attribute "Employee ID." The column beneath the attribute field 523 includes employee ID values for a set of records. Each row in the table corresponds to a different record. The values for the fields in each row correspond to values for the corresponding attributes. Attribute field 524 specifies an attribute "Locations." The column beneath the attribute field 524 includes location values for the set of records. Attribute field 527 specifies an attribute "Qualification." The column beneath the attribute field 527 includes qualification values for the set of records.

The recommendation enablement criteria metadata 528 specify recommendation enablement criteria **528*a* for the respective attribute fields 523-527. The employee ID attribute field corresponds to recommendation enablement criteria associated with a medium authority level for a user and a time of 2 seconds that a user hovers a cursor over a form field mapped to the employee ID attribute field 523. The Location attribute field corresponds to recommendation enablement criteria associated with a flag that enables recommendations without restriction. The Class attribute field corresponds to recommendation enablement criteria associated with a medium authority level for a user. The Team attribute field corresponds to recommendation enablement criteria associated with a flag that does not allow recommendations. The Qualification attribute field corresponds to recommendation enablement criteria associated with a high authority level for a user and a time of 2 seconds that a user hovers a cursor over a form field mapped to the Qualification attribute field 527**.

Figure 5C:
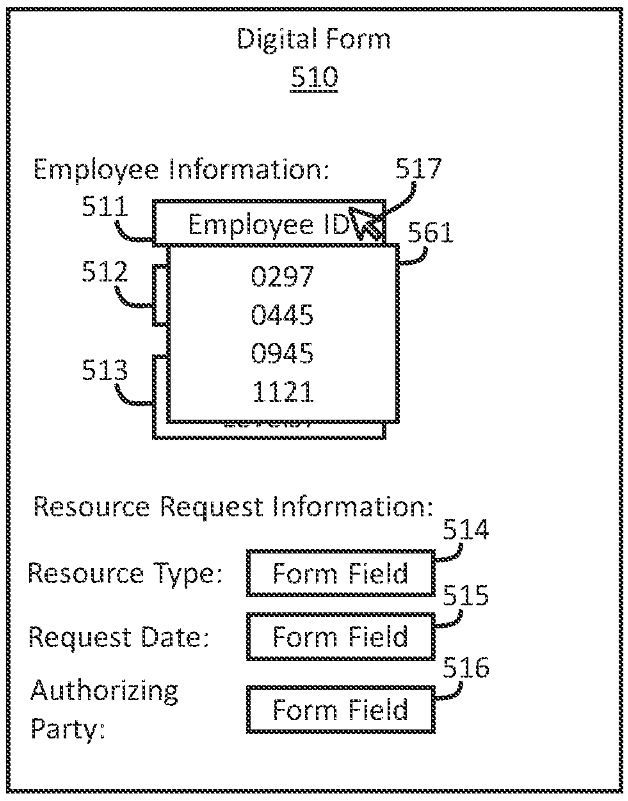

Referring to FIG. 5A, the digital form management platform 501 retrieves recommendation enablement metadata associated with the form fields 511, 512, 514, and 514 from the corresponding data object resources 521 and 541. For example, when a user selects an icon representing the digital form 510, or when a user follows a universal resource locator (URL) to cause the digital form management platform 501 to display the digital form 510, the digital form management platform 501 loads the digital form data, including text, graphics, and form field position and size data. The digital management platform 501 also retrieves the recommendation enablement data associated with the form fields 511, 512, 514, and 514 from the corresponding data object resources 521 and 541. Referring to FIG. 5C, when a user causes a cursor 517 to hover over the employee ID form field 511, the digital form management platform 501 accesses the recommendation enablement criteria for the form field 511, obtained from the data object resource 521, to determine whether the recommendation enablement criteria are met. The digital form management platform 501 determines that the form field 511 corresponds to recommendation enablement criteria of a medium user authority level and a 2 second cursor hover. The digital form management platform 501 compares the authority level of the user accessing the form 510 to the medium authority level threshold and determines that the user has a medium authority level. The digital form management platform 501 further compares the cursor hover time of the cursor 517 with the recommendation enablement criteria. Once the digital form management platform 501 determines that the cursor 517 has hovered over the form field 511 for at least 2 seconds, the digital form management platform 501 generates a drop-down menu 561 with a set of recommended values for the user to enter into the form field 511. The user may move the cursor 517 to one of the values and select the value to have the digital form management platform 501 enter the value into the form field 511.

The digital form management platform 501 generates the recommendations for entering data into the form field 511 by applying a set of input data to a machine learning model trained to generate recommendations for the form field 511. The machine learning model may be trained based on input data including: user information (e.g., identity, location, position in a company), a user's form field entry history, a user's form field recommendation selection history, and data object resource data, such as a type of data associated with the form field 511. The digital form management platform 501 applies a set of input data, including user data and data object resource data, to the machine learning model to generate the set of recommendations (such as "0297," "0445," "0945," and "1121").

According to the embodiment illustrated in FIGS. 5A-5E, the digital form 510 is a web page and the digital form management platform 501 displays the digital form 510 in a web browser of a local user device, such as a personal computer, laptop, or other personal computing device. The web browser runs a machine learning model for generating the recommended employee ID values. The digital form management platform 501 also includes a cloud-based component running on one or more servers remote from the local user device displaying the digital form 510 in the web browser. The cloud-based component includes a machine learning engine. The machine learning engine trains a recommendation machine learning model to generate recommendations for data to be entered into form fields. When a user interacts with a form field in a digital form, the local device sends the user interaction data to the machine learning engine in the cloud-based component. The machine learning engine trains the recommendation machine learning model based on the user interactions on the user's local device(s). When a user opens a digital form management platform client on a new local device, the cloud-based server sends the trained machine learning model to the new local device. Accordingly, the local device runs a local of the machine learning model corresponding to the most recently-trained machine learning model. In addition, the cloud-based machine learning engine updates the machine learning model based on the user's activity on the user's local device(s). The cloud-based machine learning engine sends the updated model to local devices when the user initiates the digital form management platform client on the local devices. For example, the cloud-based machine learning engine may send the updated model to a local device each time a user runs the digital form management platform client in a browser on the local device.

Figure 5D:
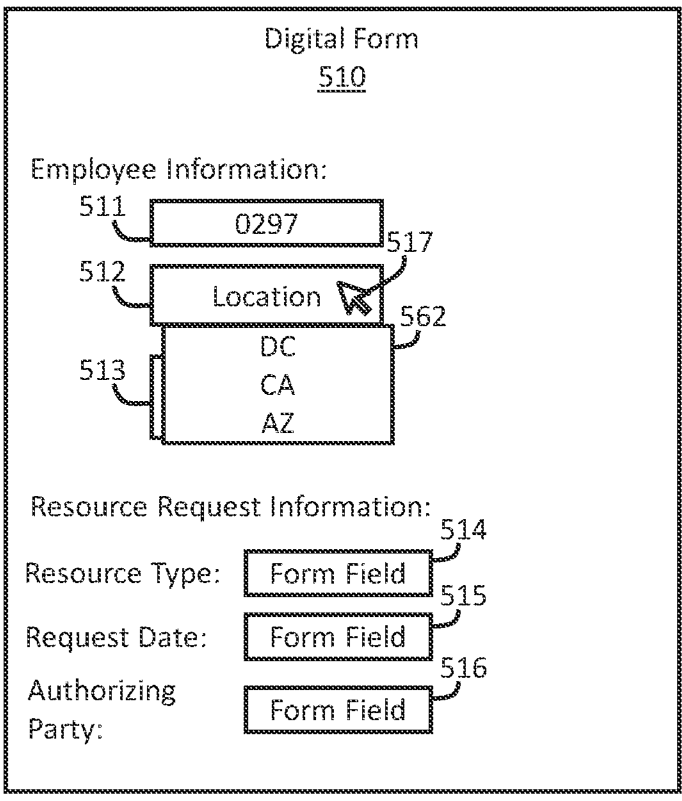

Referring to FIG. 5D, when a user causes a cursor 517 to hover over the Location form field 512, the digital form management platform 501 accesses the recommendation enablement criteria for the form field 512, obtained from the data object resource 521, to determine whether the recommendation enablement criteria are met. The digital form management platform 501 determines that the form field 512 corresponds to recommendation enablement criteria of a flag that always allows recommendations. The digital form management platform 501 transmits a set of input data to a machine learning model corresponding to the form field 512. The machine learning model generates a set of recommendations (e.g., "DC, CA, AZ"). The digital form management platform 501 presents the recommendations in the drop-down menu 562.

Figure 5E:
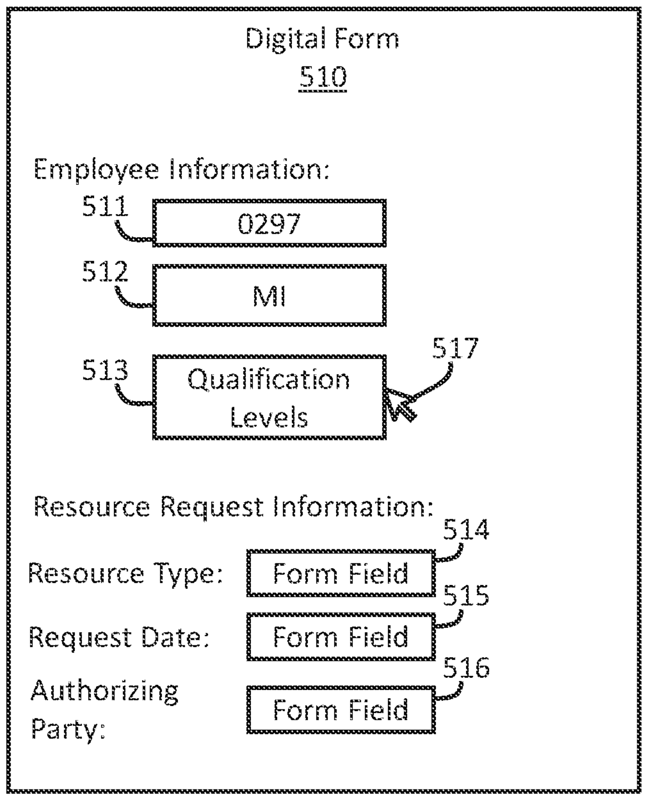

Referring to FIG. 5E, when a user causes a cursor 517 to hover over the "Qualification Levels" form field 513, the digital form management platform 501 accesses the recommendation enablement criteria for the form field 513, obtained from the data object resource 521, to determine whether the recommendation enablement criteria are met. The digital form management platform 501 determines that the form field 513 corresponds to recommendation enablement criteria of a high user authority level and a 2 second cursor hover. The digital form management platform 501 compares the authority level of the user accessing the form 510 to the high authority level threshold and determines that the user does not have a high authority level. Accordingly, the digital form management platform 501 determines the recommendation enablement criteria are not met, and does not generate or display any recommendations for a user to enter into the form field 513.

Figure 6A:
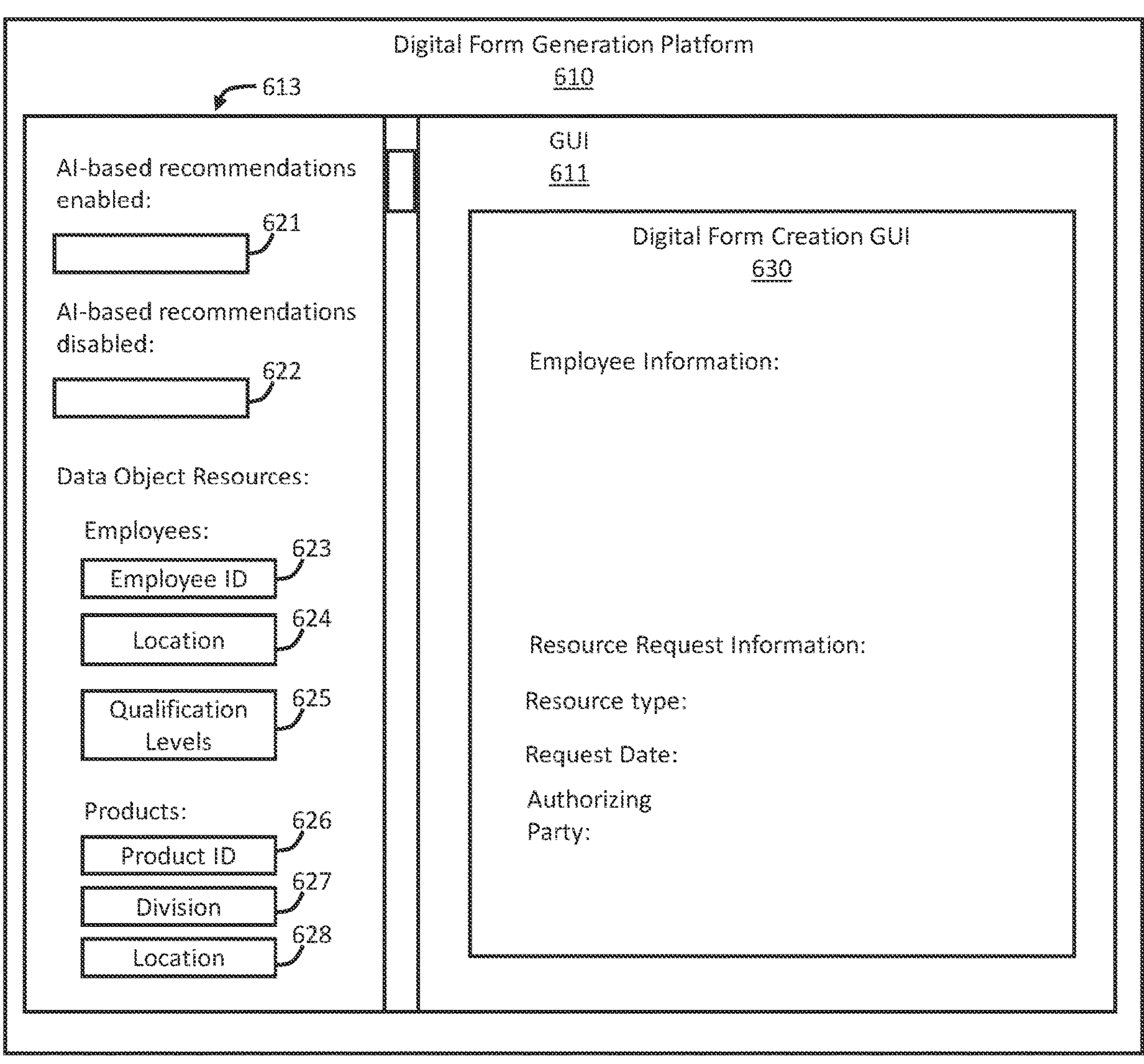
FIGS. 6A-6C illustrate an example embodiment for generating a digital form using user interface elements pre-configured to enable/disable AI-based recommendations in the rendered digital form.
Figure 6B:
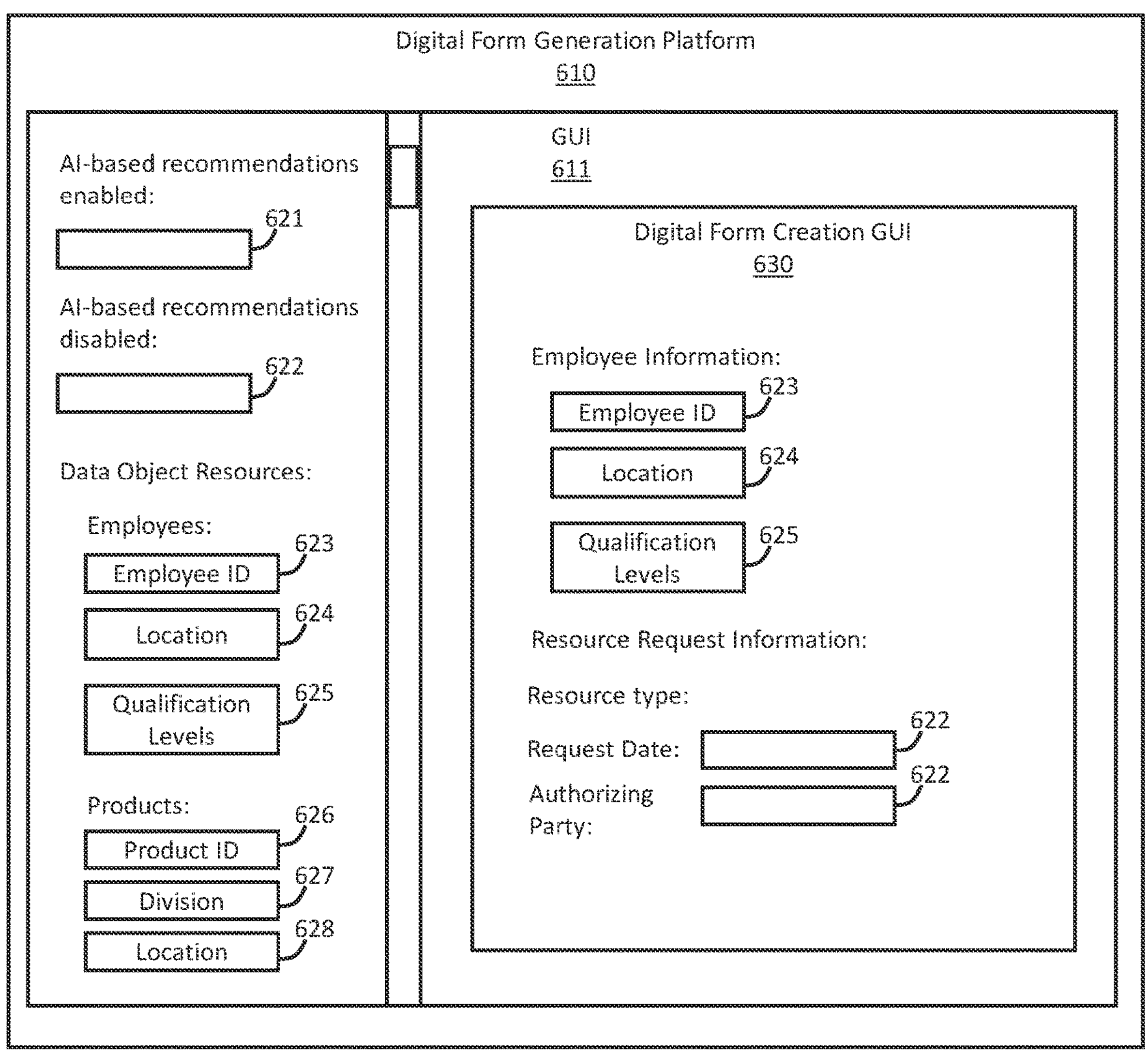
Figure 6C:
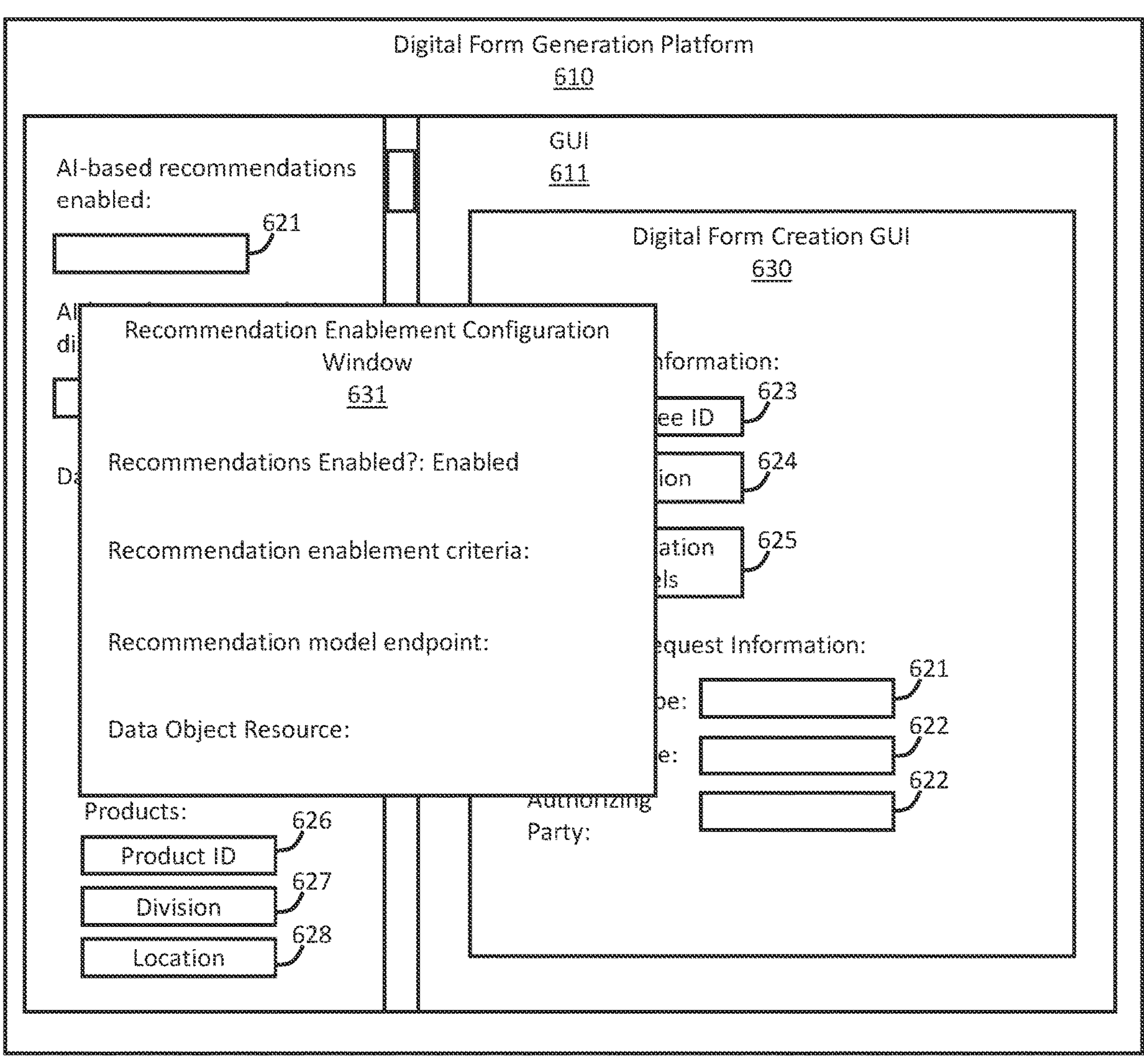

FIGS. 6A-6C illustrate an example embodiment of a graphical user interface (GUI) for generating a form including form fields that are pre-configured to allow AI-based recommendations.

A digital form generation platform 610 presents a GUI 611 for generating forms. The GUI 611 includes a region 630 representing a form to be generated, and a region 613 including selectable user interface (UI) elements 621-628 representing fields to be added to the form 630. In the example illustrated in FIG. 6A. UI element 621 represents a form field for which AI-based recommendations are enabled, but which is not mapped to any particular data object resource. For example, the system may store metadata associated with the UI element 621 including a data transmission path for transmitting data entered in the field, and selections made by end users, to a machine learning model for generating recommendations. The UI element 622 represents a form field for which AI-based recommendations are disabled. UI element 623 represents a form field mapped to an "employee ID" field of a data object resource "employees." Similarly, UI element 624 is mapped to a "location" field and UI element 625 is mapped to a "qualification levels" field. In one embodiment, the data object resource stores metadata for the corresponding fields (i.e., employee ID, location, and qualification levels) specifying whether AI-based recommendations are enabled for the field, whether conditions exist for enabling AI-based recommendations, and how a system should obtain the AI-based recommendations from a machine learning model when an end-user interacts with the rendered digital form. Fields 626, 627, and 628 are mapped to a product ID field, a division field, and a location field of a data object resource "Products."

A user interacts with the UI elements 621-628 to insert corresponding form fields in the digital form 630. For example, as illustrated in FIG. 6B, a user drags UI elements 623-625:36 into the region 630 representing the digital form to generate corresponding form fields in the form 630. Similarly, the user drags UI element 622 into the region 630 representing the digital form to generate form fields in the digital form for which AI-based recommendations are not enabled. As illustrated in FIG. 6C, a user drags the UI element 621 into the region 630 corresponding to the digital form to generate a corresponding form field in the form 630. In one embodiment, when the user selects a UI element 621 corresponding to a form field that is not mapped to a data object resource, the system presents a configuration window 631 to allow the user to configure recommendation-enablement settings for the form field. For example, the system may present regions for the user to confirm that AI-based recommendations are enabled, to specify any recommendation-enablement criteria, to specify an endpoint or data transmission path (such as a universal resource locator (UIRL) associated with a recommendation-generating machine learning model, and any data object a user may choose to map to the form field 621.

In addition to the configurable settings illustrated in FIG. 6C, the system may allow a user to specify additional configuration settings for the form field 621, such as an authority level of a user that may be required to modify form field settings or change a recommendation-enablement setting, and/or types and formats of data to be sent to a machine learning model and received from the machine learning model.

In the embodiment illustrated in FIGS. 6A-6C, if a UI element is configured to permit AI-based recommendations when implemented in a digital form, the system generates software instructions or code to obtain recommendation data. The software instructions are configured to execute operations that transmit data to a machine learning model and receive the recommendation data from the machine learning model, without requiring the user to write such instructions.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
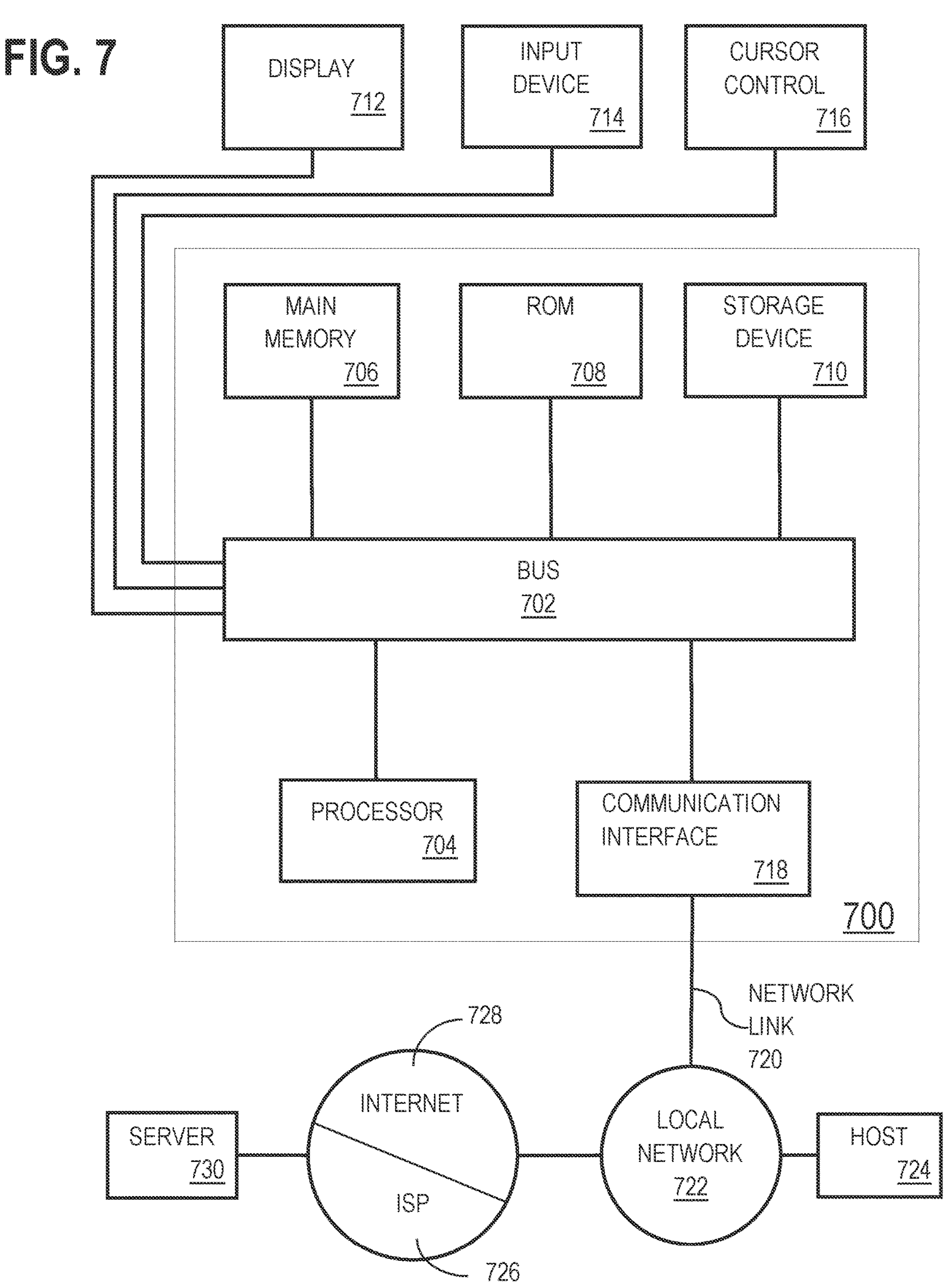
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

displaying, in a Graphical User Interface (GUI), a plurality of data entry fields associated with a first data object resource, wherein the plurality of data entry fields are displayed in a data entry mode that allows a user to submit values in relation to the plurality of data entry fields;

subsequent to displaying the plurality of data entry fields in the GUI, monitoring user interaction with a first data entry field of the plurality of data entry fields to generate a first set of user interaction data indicating a first amount of time that the user has spent interacting with the first data entry field to submit user input in relation to the first data entry field;

determining that the first set of user interaction data meets a first set of recommendation enablement criteria at least by determining that the first amount of time the user has spent interacting with the first data entry field exceeds a first threshold time duration, wherein the first set of recommendation enablement criteria are stored in the first data object resource; and responsive to determining that the first amount of time the user has spent interacting with the first data entry field exceeds the first threshold time duration:

displaying a recommended value for the first data entry field of the plurality of data entry fields, wherein the first data object resource stores information identifying a set of records, and wherein the recommended value is accessed from among a set of fields included in the set of records identified in the first data object resource.

2. The non-transitory computer readable medium of claim 1, wherein the operations further comprise:

generating a second set of user interaction data indicating a second amount of time that the user has spent interacting with a second data entry field;

determining whether the second set of user interaction data meets a second set of recommendation enablement criteria at least by determining that the second amount of time the user has spent interacting with the second data entry field does not meet a second threshold time duration; and responsive to determining that the second amount of time the user has spent interacting with the second data entry field does not meet the second threshold time duration:

refraining from displaying any recommended value for the second data entry field of the plurality of data entry fields.

3. The non-transitory computer readable medium of claim 2, wherein the operations further comprise:

determining the first set of recommendation enablement criteria based on a first set of metadata stored in association with the first data entry field; and determining the second set of recommendation enablement criteria based on a second set of metadata stored in association with the second data entry field.

4. The non-transitory computer readable medium of claim 1, wherein the first set of user interaction data indicates a second amount of time that has passed since user input was received from the user, wherein the first set of recommendation enablement criteria specifies a second threshold time duration, and wherein determining that the first set of user interaction data meets the first set of recommendation enablement criteria comprises determining that the second amount of time that has passed exceeds the second threshold time duration.

5. The non-transitory computer readable medium of claim 1, wherein the first set of user interaction data comprises information regarding an acceptance rate and/or rejection rate associated with previously presented recommended values, and wherein the first set of recommendation enablement criteria specifies a threshold to be compared to the acceptance rate and/or the rejection rate to determine whether to present the recommended value for the first data entry field.

6. The non-transitory computer readable medium of claim 1, wherein the operations further comprise:

training a machine learning model based on training data sets, a first training data set of the training data sets comprising:

a particular set of user interaction data; and a label indicating whether recommendations are to be enabled or disabled based on the particular set of user interaction data, and wherein determining whether the first set of user interaction data meets the first set of recommendation enablement criteria comprises applying the trained machine learning model to the first set of user interaction data to determine whether to enable or disable recommendations for the first data entry field.

7. The non-transitory computer readable medium of claim 1, wherein the user interaction with the first data entry field comprises an attempt to submit a user-determined value for the first data entry field, wherein the user interaction does not include any command to enable or disable value recommendations for the first data entry field.

8. The non-transitory computer readable medium of claim 1, wherein the operations further comprise:

determining the first set of recommendation enablement criteria based on a set of form-specific metadata stored in association with a form comprising the plurality of data entry fields.

9. The non-transitory computer readable medium of claim 1, wherein the first set of user interaction data indicates a second amount of time taken by the user to complete a second data entry field of the plurality of data entry fields.

10. The non-transitory computer readable medium of claim 1, wherein the first set of user interaction data comprises a second amount of time that has passed between receiving second data in a second form field and receiving the user input in relation to the first data entry field.

11. The non-transitory computer readable medium of claim 1, wherein determining that the first amount of time the user has spent interacting with the first data entry field exceeds the first threshold time duration comprises determining a particular amount of time that the first data entry field has been selected for receiving user input.

12. The non-transitory computer readable medium of claim 1, wherein the first set of recommendation enablement criteria further comprise at least one of:

an authorization level of the user; and a position of the user in a company.

13. The non-transitory computer readable medium of claim 1, wherein the first set of recommendation enablement criteria include a binary value representing whether recommendations are enabled or disabled for the first data entry field among the plurality of data entry fields, and wherein determining whether the first set of user interaction data meets the first set of recommendation enablement criteria is based at least on determining the binary value specifies recommendations are enabled for the first data entry field.

14. A method, comprising:

displaying, in a Graphical User Interface (GUI), a plurality of data entry fields associated with a first data object resource, wherein the plurality of data entry fields are displayed in a data entry mode that allows a user to submit values in relation to the plurality of data entry fields;

subsequent to displaying the plurality of data entry fields in the GUI, monitoring user interaction with a first data entry field of the plurality of data entry fields to generate a first set of user interaction data indicating a first amount of time that the user has spent interacting with the first data entry field to submit user input in relation to the first data entry field;

determining that the first set of user interaction data meets a first set of recommendation enablement criteria at least by determining that the first amount of time the user has spent interacting with the first data entry field exceeds a first threshold time duration, wherein the first set of recommendation enablement criteria are stored in the first data object resource; and responsive to determining that the first amount of time the user has spent interacting with the first data entry field exceeds the first threshold time duration:

displaying a recommended value for the first data entry field of the plurality of data entry fields, wherein the first data object resource stores information identifying a set of records, and wherein the recommended value is accessed from among a set of fields included in the set of records identified in the first data object resource.

15. The method of claim 14, further comprising:

generating a second set of user interaction data indicating a second amount of time that the user has spent interacting with a second data entry field to submit user input in relation to the second data entry field;

determining whether the second set of user interaction data meets a second set of recommendation enablement criteria at least by determining that the second amount of time the user has spent interacting with the second data entry field does not meet a second threshold time duration; and responsive to determining that the second amount of time the user has spent interacting with the second data entry field does not meet the second threshold time duration:

refraining from displaying any recommended value for the second data entry field of the plurality of data entry fields.

16. The method of claim 15, further comprising:

determining the first set of recommendation enablement criteria based on a first set of metadata stored in association with the first data entry field; and determining the second set of recommendation enablement criteria based on a second set of metadata stored in association with the second data entry field.

17. The method of claim 14, wherein the first set of user interaction data indicates a second amount of time that has passed since user input was received from the user, wherein the first set of recommendation enablement criteria specifies a second threshold time duration, and wherein determining that the first set of user interaction data meets the first set of recommendation enablement criteria comprises determining that the second amount of time that has passed exceeds the second threshold time duration.

18. The method of claim 14, wherein the first set of user interaction data comprises information regarding an acceptance rate and/or rejection rate associated with previously presented recommended values, and wherein the first set of recommendation enablement criteria specifies a threshold to be compared to the acceptance rate and/or the rejection rate to determine whether to present the recommended value for the first data entry field.

19. The method of claim 14, further comprising:

training a machine learning model based on training data sets, a first training data set of the training data sets comprising:

a particular set of user interaction data; and a label indicating whether recommendations are to be enabled or disabled based on the particular set of user interaction data, wherein determining whether the first set of user interaction data meets the first set of recommendation enablement criteria comprises applying the trained machine learning model to the first set of user interaction data to determine whether to enable or disable recommendations for the first data entry field.

20. The method of claim 14, wherein the user interaction with the first data entry field comprises an attempt to submit a user-determined value for the first data entry field, wherein the user interaction does not include any command to enable or disable value recommendations for the first data entry field.

21. The method of claim 14, further comprising:

determining the first set of recommendation enablement criteria based on a set of form-specific metadata stored in association with a form comprising the plurality of data entry fields.

22. A system, comprising:

one or more processors; and memory storing instructions that, when executed by the one or more processors, cause the system to perform:

displaying, in a Graphical User Interface (GUI), a plurality of data entry fields associated with a first data object resource, wherein the plurality of data entry fields are displayed in a data entry mode that allows a user to submit values in relation to the plurality of data entry fields;

subsequent to displaying the plurality of data entry fields in the GUI, monitoring user interaction with a first data entry field of the plurality of data entry fields to generate a first set of user interaction data indicating a first amount of time that the user has spent interacting with the first data entry field to submit user input in relation to the first data entry field;

determining that the first set of user interaction data meets a first set of recommendation enablement criteria at least by determining that the first amount of time the user has spent interacting with the first data entry field exceeds a first threshold time duration, wherein the first set of recommendation enablement criteria are stored in the first data object resource; and responsive to determining that the first amount of time the user has spent interacting with the first data entry field exceeds the first threshold time duration:

displaying a recommended value for the first data entry field of the plurality of data entry fields, wherein the first data object resource stores information identifying a set of records, and wherein the recommended value is accessed from among a set of fields included in the set of records identified in the first data object resource.

* * * * *